US010005935B2

(12) United States Patent
Fornes et al.

(10) Patent No.: US 10,005,935 B2
(45) Date of Patent: Jun. 26, 2018

(54) ADHESIVE FOR RUBBER BONDING

(71) Applicant: LORD Corporation, Cary, NC (US)

(72) Inventors: Timothy Fornes, Apex, NC (US); Christopher Cox, Garner, NC (US)

(73) Assignee: LORD Corporation, Cary, NC (US)

( * ) Notice: Subject to any disclaimer, the term of this patent is extended or adjusted under 35 U.S.C. 154(b) by 0 days. days.

(21) Appl. No.: 15/142,713

(22) Filed: Apr. 29, 2016

(65) Prior Publication Data

US 2016/0319171 A1 Nov. 3, 2016

Related U.S. Application Data

(60) Provisional application No. 62/155,792, filed on May 1, 2015, provisional application No. 62/204,102, filed on Aug. 12, 2015.

(51) Int. Cl.
| | |
|---|---|
| C09J 163/00 | (2006.01) |
| C09J 163/04 | (2006.01) |
| C09J 161/06 | (2006.01) |
| C09J 133/10 | (2006.01) |
| B32B 7/12 | (2006.01) |
| B32B 15/06 | (2006.01) |
| B32B 25/04 | (2006.01) |
| B32B 25/12 | (2006.01) |
| B32B 25/18 | (2006.01) |
| B32B 25/16 | (2006.01) |
| B32B 25/14 | (2006.01) |
| C09J 5/06 | (2006.01) |
| C09J 7/00 | (2018.01) |
| B32B 15/04 | (2006.01) |
| B32B 25/00 | (2006.01) |
| B32B 7/06 | (2006.01) |
| C09J 7/10 | (2018.01) |

(52) U.S. Cl.
CPC .............. *C09J 163/00* (2013.01); *B32B 7/06* (2013.01); *B32B 7/12* (2013.01); *B32B 15/04* (2013.01); *B32B 15/06* (2013.01); *B32B 25/00* (2013.01); *B32B 25/04* (2013.01); *B32B 25/12* (2013.01); *B32B 25/14* (2013.01); *B32B 25/16* (2013.01); *B32B 25/18* (2013.01); *C09J 5/06* (2013.01); *C09J 7/00* (2013.01); *C09J 7/10* (2018.01); *C09J 133/10* (2013.01); *C09J 161/06* (2013.01); *C09J 163/04* (2013.01); *B32B 2250/02* (2013.01); *B32B 2255/10* (2013.01); *B32B 2255/26* (2013.01); *B32B 2307/748* (2013.01); *C09J 2201/61* (2013.01); *C09J 2400/163* (2013.01); *C09J 2413/00* (2013.01); *C09J 2421/00* (2013.01); *C09J 2421/006* (2013.01); *C09J 2423/04* (2013.01); *C09J 2461/00* (2013.01); *C09J 2463/00* (2013.01)

(58) Field of Classification Search
CPC ...................................................... C09J 163/00

USPC ......................................................... 428/457
See application file for complete search history.

(56) References Cited

U.S. PATENT DOCUMENTS

| | | |
|---|---|---|
| 2,619,445 A | 11/1952 | Kalafus |
| 2,900,292 A | 8/1959 | Coleman, Jr. et al. |
| 3,053,712 A | 9/1962 | Grabowski |
| 3,542,639 A | 11/1970 | Manino |
| 3,637,559 A | 1/1972 | Pinkney |
| 3,814,713 A | 6/1974 | Honda et al. |
| 3,826,772 A | 7/1974 | Gebhard et al. |
| 3,859,701 A | 1/1975 | Huber |
| 3,879,337 A | 4/1975 | Manino et al. |
| 3,894,982 A | 7/1975 | Polaski |
| 3,903,332 A | 9/1975 | Kelly et al. |
| 4,007,079 A | 2/1977 | Turley et al. |
| 4,033,924 A | 7/1977 | Mine et al. |
| 4,070,225 A | 1/1978 | Batdorf |
| 4,167,500 A | 9/1979 | Jazenski et al. |
| 4,296,708 A | 10/1981 | Robertson et al. |
| 4,308,071 A | 12/1981 | Gervase |
| 4,308,365 A | 12/1981 | Czerwinski |
| 4,349,403 A | 9/1982 | Blenner et al. |
| 4,327,150 A | 12/1982 | White et al. |
| 4,366,184 A | 12/1982 | Auerbach et al. |
| 4,483,962 A | 11/1984 | Sadowski |
| 4,534,815 A | 8/1985 | Hamada et al. |
| 4,680,076 A | 7/1987 | Bard |
| 4,701,279 A | 10/1987 | Kawaguchi et al. |
| 4,810,521 A | 3/1989 | Robertson |
| 4,861,833 A | 8/1989 | Chasser et al. |
| 4,872,932 A | 10/1989 | Yoshikawa et al. |

(Continued)

FOREIGN PATENT DOCUMENTS

| | | |
|---|---|---|
| EP | 0 287 190 | 10/1988 |
| EP | 0 431 762 | 6/1991 |

(Continued)

OTHER PUBLICATIONS

Bruno, Florence et al., Cured rubber-to-rubber bonding: Use of a functionalized PA film compared to available solvent-based adhesives, Rubber World, Feb. 2014, pp. 19-22.

*Primary Examiner* — Terressa Boykin

(74) *Attorney, Agent, or Firm* — Todd W. Galinski

(57) ABSTRACT

Films comprising a resin matrix, an entanglement polymer, and a latent curative, wherein the resin has a functionality of at least 2.0 and a viscosity of at least 0.1 Pascal-seconds, and the film is dimensionally stable at 25° C. The films are particularly useful for the bonding of elastomers to rigid substrates, such as rubber to metal, and contain no volatile organic compounds (VOCs), and are shelf stable for extended periods of time.

32 Claims, No Drawings

(56) References Cited

U.S. PATENT DOCUMENTS

| | | |
|---|---|---|
| 4,948,824 A | 8/1990 | Auerbach et al. |
| 4,994,519 A | 2/1991 | Scheer |
| 5,028,654 A | 7/1991 | Wuest et al. |
| 5,030,515 A | 7/1991 | Ozawa et al. |
| 5,063,098 A | 11/1991 | Niwa et al. |
| 5,084,532 A | 1/1992 | Schenkel |
| 5,110,630 A | 5/1992 | Abe et al. |
| 5,122,420 A | 6/1992 | Baron et al. |
| 5,128,403 A | 7/1992 | Warren et al. |
| 5,139,601 A | 8/1992 | Holmes-Farley et al. |
| 5,213,739 A | 5/1993 | Dickerson et al. |
| 5,268,404 A | 12/1993 | Mowrey |
| 5,271,977 A | 12/1993 | Yoshikawa et al. |
| 5,354,805 A | 10/1994 | Treat et al. |
| 5,385,979 A | 1/1995 | Ozawa et al. |
| 5,414,053 A | 5/1995 | Volkmann et al. |
| 5,416,127 A | 5/1995 | Chandran et al. |
| 5,418,262 A | 5/1995 | Gobel |
| 5,461,090 A | 10/1995 | Sweet |
| 5,478,654 A | 12/1995 | Hargis et al. |
| 5,589,532 A | 12/1996 | Hargis et al. |
| 6,057,382 A | 5/2000 | Karin et al. |
| 6,117,257 A | 9/2000 | Takahashi et al. |
| 6,136,732 A | 10/2000 | Patel |
| 6,193,835 B1 | 2/2001 | Yoshikawa et al. |
| 6,268,422 B1 | 7/2001 | Weih et al. |
| 6,287,411 B1 | 9/2001 | Kelley et al. |
| 6,397,465 B1 | 6/2002 | Zheng et al. |
| 6,475,621 B1 | 11/2002 | Kohli et al. |
| 6,497,337 B1 | 12/2002 | Kehe |
| 6,512,039 B1 | 1/2003 | Mowrey |
| 6,627,691 B2 | 9/2003 | Mowrey et al. |
| 6,632,319 B1 | 10/2003 | Yoshikawa et al. |
| 6,648,023 B2 | 11/2003 | Nakakita et al. |
| 6,756,079 B2 | 6/2004 | Van Ooij et al. |
| 6,777,026 B2 | 8/2004 | Halladay et al. |
| 6,804,768 B2 | 10/2004 | Agarwal et al. |
| 6,833,398 B2 | 12/2004 | Agarwal et al. |
| 6,852,417 B2 | 2/2005 | Fuller |
| 6,884,843 B2 | 4/2005 | Kauffman et al. |
| 6,902,760 B2 | 6/2005 | Wefringhaus et al. |
| 7,008,987 B2 | 3/2006 | Okada et al. |
| 7,109,265 B2 | 9/2006 | Kucera et al. |
| 7,125,942 B2 | 10/2006 | Kotzev |
| 7,138,450 B2 | 11/2006 | Wentworth et al. |
| 7,172,681 B2 | 2/2007 | Sato et al. |
| 7,291,241 B2 | 11/2007 | Dunlap |
| 7,311,978 B2 | 12/2007 | Fukasawa et al. |
| 7,354,658 B2 | 4/2008 | Sugano et al. |
| 7,384,028 B2 | 6/2008 | Sugiura et al. |
| 7,405,010 B2 | 7/2008 | Grimberg et al. |
| 7,524,910 B2 | 4/2009 | Jiang et al. |
| 7,531,056 B2 | 5/2009 | Iwasaki et al. |
| 7,556,209 B2 | 7/2009 | Sears |
| 7,687,591 B2 | 3/2010 | Bhagwagar et al. |
| 7,763,121 B2 | 7/2010 | Tohyama et al. |
| 8,022,130 B2 | 9/2011 | Nowak et al. |
| 8,029,906 B2 | 10/2011 | Van Ooij et al. |
| 8,153,268 B1 | 4/2012 | Fay et al. |
| 8,303,762 B2 | 11/2012 | Fay et al. |
| 8,309,215 B2 | 11/2012 | Yokota et al. |
| 2001/0028953 A1 | 10/2001 | Bluem et al. |
| 2002/0182955 A1 | 12/2002 | Weglewski et al. |
| 2003/0045635 A1 | 3/2003 | Lukacs, III |
| 2003/0066603 A1 | 4/2003 | Halladay et al. |
| 2004/0033374 A1 | 2/2004 | Mowrey |
| 2005/0019590 A1 | 1/2005 | Josefsson |
| 2005/0101725 A1 | 5/2005 | Carney |
| 2006/0014867 A1 | 1/2006 | Green et al. |
| 2006/0245936 A1 | 11/2006 | Shibata et al. |
| 2007/0017603 A1 | 1/2007 | Quellhorst et al. |
| 2007/0027233 A1 | 2/2007 | Yamaguchi et al. |
| 2007/0149665 A1 | 6/2007 | Mowrey et al. |
| 2007/0243372 A1 | 10/2007 | Mowrey et al. |
| 2008/0177000 A1* | 7/2008 | Ahn ..................... C08K 5/0008 525/95 |
| 2008/0188609 A1 | 8/2008 | Agarwal et al. |
| 2008/0251203 A1 | 10/2008 | Lutz et al. |
| 2008/0299317 A1 | 12/2008 | Hable |
| 2008/0308212 A1 | 12/2008 | Sheasley et al. |
| 2008/0319105 A1 | 12/2008 | Lutz et al. |
| 2009/0130469 A1 | 5/2009 | Wei et al. |
| 2009/0294057 A1 | 12/2009 | Liang et al. |
| 2009/0311502 A1 | 12/2009 | McCutcheon et al. |
| 2010/0028651 A1 | 2/2010 | Golden et al. |
| 2010/0048793 A1 | 2/2010 | Baekelandt et al. |
| 2010/0112346 A1 | 5/2010 | Kondou et al. |
| 2010/0178500 A1 | 7/2010 | Wada et al. |
| 2010/0255336 A1 | 10/2010 | Zabinski |
| 2010/0330352 A1 | 12/2010 | Feng et al. |
| 2011/0036497 A1 | 2/2011 | Lammerschop et al. |
| 2011/0056779 A1 | 3/2011 | McGee et al. |
| 2011/0070430 A1 | 3/2011 | Shirai et al. |
| 2011/0086973 A1 | 4/2011 | Kobayashi et al. |
| 2011/0180970 A1 | 7/2011 | Wittenbecher et al. |
| 2011/0206840 A1 | 8/2011 | Halladay et al. |
| 2011/0209822 A1 | 9/2011 | Halladay |
| 2011/0254235 A1 | 10/2011 | Abe et al. |
| 2012/0064331 A1 | 3/2012 | Wollack et al. |
| 2012/0090756 A1 | 4/2012 | Le Clerc |
| 2012/0103517 A1 | 5/2012 | Eagle et al. |
| 2012/0121878 A1 | 5/2012 | Bilcai et al. |
| 2012/0142816 A1 | 6/2012 | Argyropoulos et al. |
| 2012/0164904 A1 | 6/2012 | Fay et al. |
| 2012/0202091 A1 | 8/2012 | Fay et al. |
| 2012/0225318 A1 | 9/2012 | Inoue et al. |
| 2012/0263949 A1 | 10/2012 | Wollack et al. |
| 2012/0315472 A1 | 12/2012 | Yamakawa et al. |
| 2012/0329900 A1 | 12/2012 | Liu et al. |
| 2013/0023603 A1 | 1/2013 | Walter et al. |
| 2013/0090432 A1 | 4/2013 | Ming et al. |
| 2013/0115442 A1 | 5/2013 | Sang et al. |
| 2013/0280544 A1 | 10/2013 | Craun et al. |
| 2013/0344323 A1 | 12/2013 | Fujii et al. |
| 2014/0072820 A1 | 3/2014 | Chen |
| 2014/0134439 A1 | 5/2014 | Bergkvist |
| 2014/0216644 A1 | 8/2014 | Keite-Telgenbuscher |
| 2014/0216654 A1 | 8/2014 | Keite-Telgenbuscher |
| 2016/0032157 A1 | 2/2016 | Hoshi et al. |

FOREIGN PATENT DOCUMENTS

| | | |
|---|---|---|
| EP | 0 509 721 | 10/1992 |
| EP | 0 889 105 | 1/1999 |
| EP | 0 695 332 | 12/1999 |
| EP | 1 272 582 | 1/2003 |
| EP | 1 320 566 | 6/2003 |
| EP | 1 363 967 | 11/2003 |
| EP | 1 797 153 | 6/2007 |
| EP | 2 009 030 | 12/2008 |
| EP | 2 537 672 | 12/2012 |
| JP | 56-106852 | 8/1981 |
| JP | 56-135052 | 10/1981 |
| JP | 62-115065 | 5/1987 |
| JP | 06-171011 | 6/1994 |
| JP | 2003-277579 | 10/2003 |
| JP | 2010-13567 | 1/2010 |
| JP | 2010-158859 | 7/2010 |
| JP | 2013-72081 | 4/2013 |
| WO | 88/07931 | 10/1988 |
| WO | 96/17880 | 6/1996 |
| WO | 02/068508 | 9/2002 |
| WO | 2005/056659 | 6/2005 |
| WO | 2008/147955 | 12/2008 |
| WO | 2010/136086 | 12/2010 |
| WO | 2012/139207 | 10/2012 |
| WO | 2012/146298 | 11/2012 |
| WO | 2013/142751 | 9/2013 |
| WO | 2013/151835 | 10/2013 |
| WO | 2014/103040 | 7/2014 |

* cited by examiner

ADHESIVE FOR RUBBER BONDING

CROSS REFERENCE TO RELATED APPLICATIONS

The present application claims priority under 35 U.S.C. § 119(e) from U.S. Provisional Patent Application Ser. No. 62/155,792, filed on May 1, 2015 and 62/204,102, filed Aug. 12, 2015 the disclosures of which are incorporated herein by reference in their entirety.

FIELD OF THE INVENTION

The present invention relates to an adhesive for bonding elastomers to rigid substrates and a method of use, and more particularly a room-temperature solid, dimensionally stable adhesive film suitable for bonding elastomers, preferably natural rubber, to rigid substrates, such as steel.

BACKGROUND OF THE INVENTION

Rubber-to-metal bonding adhesives are commonly used in applications where a robust, rubber-tearing bond, is required between a rubber and metal substrate. In current processes, solvent or aqueous based adhesives are applied to the metal. Often a primer is employed along with a topcoat adhesive, wherein the primer is applied first to the metal, dried, then an adhesive is applied atop the primer. These primer/adhesive combinations are designed to chemically react with the metal, the rubber, and each other to form a chemical and mechanical bond between the substrates. Most commonly, the rubber/metal bond is formed during the vulcanization process in which heat and pressure are applied to the assembly.

In the current process common in the industry, the metal surface is cleaned, primed, and then the bonding agents are applied in a process similar to painting with a spray gun or a roller. When priming and applying the adhesive much more time is required to allow the primer and solvents to dry or "set up" to the point where rubber can be applied. Also, because of the hazards of the primers and solvents, strict handling procedures and heavy environmental regulations are in place to protect the employees and the surrounding environment, respectively.

An additional disadvantage of these bonding systems is the aqueous or solvent carrier itself. With a non-volatile content commonly in the range of 10-30%, the majority of the "product" is merely the carrier medium which is driven off prior to bonding. Thus, a substantial portion of the cost associated with shipping product from the manufacturer to a user is that associated with the non-reactive, i.e. non-participating in bonding, aspects of the product. Additionally, there are additional process steps associated with traditional adhesives including ensuring adequate mixing of product prior to application, and drying time associated with awaiting evaporation of the carrier fluid from the applied adhesive.

SUMMARY OF THE INVENTION

A first aspect of the present invention provides a composition in the form of a solid adhesive film capable of bonding elastomers to metal and other rigid substrates. Providing an adhesive film allows a simple geometry where the adhesive can be die-cut, rolled on, or wrapped around the parts to be bonded, such as bushings, hoses, pipes, dock fenders, rollers, bladders, wheels, seismic pads, bridge bearing pads, rubber track crawlers, and the like.

Further, a film adhesive is a "green" solution by eliminating the use of solvents and other volatile organic compounds, and is safer in handling and storage (less toxic, eliminates flammability and inhalation risks). Further, there is a lower carbon footprint associated with reduced fuel consumption in shipping a lower weight product, while providing the same amount of "bonding participating" compounds. A film adhesive also eliminates settling issues which can arise in solvent or aqueous delivered adhesives.

For the purposes of this invention, an adhesive film is defined as a solid, free-standing adhesive that is dimensionally stable at room temperature (about 25° C.) with top and bottom surfaces have adhesive characteristics. In some embodiments of the present invention, a temporary backing material is employed on one or both surfaces to improve handleability of the uncured film; however the backing material is removed prior to bonding. In additional embodiments of the present invention, a non-woven or woven web may be employed within the adhesive film to increase the cohesive strength of the uncured film. This web remains in place through positioning and bonding of the adhesive film.

In one embodiment of the present invention, a film is provided comprising a resin matrix, an entanglement polymer, and a latent curative, wherein the resin has a functionality of at least 2.0 and a viscosity of at least 0.1 Pascal-seconds, and the film is dimensionally stable at 25° C. In a preferred embodiment of the present invention, the resin matrix comprises a mixture of a first resin and a second resin having different molecular weights, wherein the first resin comprises a molecular weight of less than about 500 Daltons, and wherein the second resin comprises a molecular weight of about 400 to about 4000 Daltons. In a preferred embodiment of the present invention, the resin matrix comprises an epoxy-functional resin, preferably an epoxy novolac, a tris-(hydroxyl phenyl) methane-based epoxy resin.

In an embodiment of the present invention, the composition is employed as an adhesive film in conjunction with a primer to bond an elastomer to a substrate with the adhesive film on the elastomer side and the primer applied to the rigid substrate. In another embodiment of the present invention, the composition is employed as a primer film applied to a rigid substrate with an adhesive layer is employed between the primer film and elastomer. In a further embodiment of the present invention, the composition is employed as a single layer film to bond an elastomer to a rigid substrate without any additional bonding materials, such as additional primer or adhesive materials. In an additional embodiment of the present invention, the constituent materials of the adhesive are solvated in an appropriate organic solvent or water, and the adhesive is applied in liquid form and dried prior to curing/bonding.

In a further embodiment of the present invention, the composition is provided as a single film comprising two, pre-combined layers in which one layer serves a primer layer while the other layer serves as solid adhesive layer. This configuration enables the use of individual constituents that may be unstable or incompatible in the opposite layer thereby improving performance pertaining to tack and/or cured bond strength. Further, this configuration allows for a concentration of active ingredients for a particular substrate to be in the regions closest to the particular substrate.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

DETAILED DESCRIPTION

In a first embodiment of the present invention, an adhesive film is provided comprising a resin matrix, an entanglement polymer, a latent curative, and an optional elastomer crosslinker, wherein the film is dimensionally stable at 25° C.

In an embodiment of the present invention, the resin matrix, entanglement polymer, latent curative and optional elastomer crosslinker are combined together in sufficient quantities to provide an adhesive film that will bond a rigid substrate to an elastomer. Such bonds are typically measured by their peel strength in accordance with ASTM D429 "peel strength" test. In this test, specimens are prepared with the elastomer bonded to the rigid substrate then placed in a test machine and the elastomer is pulled from the rigid substrate at a 90° angle at a rate of 2 inches/minute. A successful bond typically demonstrates a peel strength of at least 25 pli, preferably at least 40 pli.

In one embodiment of the present invention, the resin matrix comprises at least one of the following reactive chemistries: epoxy, acrylic, phenolic, and urethane derivatives based on polyols and isocyanates. In a preferred embodiment of the present invention, the resin matrix in conjunction with the entanglement polymer provides tack, reactive/bonding functionality, and the molecular size preferred to enable the resin to penetrate and bind to porous or uneven substrates. In a preferred embodiment of the present invention, the resin matrix comprises a functionality of at least 2.0. In a further embodiment of the present invention, the resin matrix comprises a viscosity of at least 0.1 Pa*s as measured by cone-and-plate, parallel plate, or concentric cylinder rheometry. These properties allow the resin matrix to combine with the entanglement polymer to produce a stable film having appropriate reactivity and tack.

The tackiness of the adhesive is a viscoelastic property that controls the initial formation of a bond when the adhesive is brought into contact with a surface under light pressure, i.e. tack "holds" the film adhesive in position until the bonding/curing process can be completed. Tack or 'stickiness' is determined by the ability of the uncured adhesive to readily wet out the surface it contacts while also developing both adhesive and cohesive strength, primarily physical bonds, necessary to sustain reasonable loads. In an embodiment of the present invention, reasonable loads would be those necessary to hold the uncured film in place on a vertical surface. More preferably, the uncured film would be capable of holding both the film and the underlying rubber substrate on a vertical, rigid surface. Examples of common methods for measuring tack include rolling ball, loop tack, probe tack, 180° peel tack, and 90° peel tack. In a preferred embodiment of the present invention, tack is measured according to the ASTM D-429 90° "stripping test" wherein tack is represented in pounds per linear inch.

In one embodiment of the present invention, the resin matrix comprises a single constituent, however in a more preferred embodiment of the present invention, the resin matrix comprises a combination of two constituents. A first resin comprises a relatively low molecular weight of less than about 500 Daltons, and a second resin comprises a relatively higher molecular weight of between about 400 and about 4000 Daltons. The resin matrix comprises a flowable liquid material at room temperature (around 25° C.), however in a multi-constituent resin blend, one of the constituent materials may initially be a solid that is dissolved in the second to form a final liquid resin matrix. In a preferred embodiment of the present invention, the individual liquid component is between 10 and 90 weight percent of the total resin system, with the remainder being a solid component. More preferable, the individual liquid component is between 30 and 70 weight percent. In a most preferred embodiment the liquid component is between 40 and 60 weight percent.

Further, in an embodiment of the present invention not utilizing a separate primer composition, the resin matrix provides a substantial portion of the rigid substrate-bonding functionality of the adhesive. In an embodiment wherein the rigid substrate is metallic, the resin matrix preferably contains polar moieties that are known to enhance metal adhesion. Thus, in one preferred embodiment of the present invention, the resin matrix is selected so as to enhance compatibility with the metallic substrate. In an embodiment of the present invention used with a separate primer composition, the resin matrix in the film adhesive must be compatible with the primer composition, but does not require the rigid substrate bonding properties as these are provided through the separate primer composition.

In another embodiment, the resin component is chosen to be compatible with the entanglement polymer and to enable the adhesive to be structurally sound, yet tacky (for embodiments where tackiness is desired). Additionally, the resin is selected in conjunction with the entanglement polymer, latent curative, and other materials to remain chemically and physically stable a room temperature, i.e. nominally 25° C., over extended periods of time. In one embodiment of the present invention this stability is measured as the film remaining substantially unreacted for at least 7 days, and preferably at least 30 days at 25° C. In a further embodiment, the resin matrix is also selected to react at elevated temperatures with other constituents in the film.

In a preferred embodiment of the present invention, the resin matrix component comprises an epoxy material containing at least one epoxy functional group. The epoxy resin can be monofunctional, difunctional, multifunctional, or combinations thereof as long as the resulting material blend is liquid-like in nature at room temperature. The epoxy may be aliphatic, cycloaliphatic, aromatic, or the like. In a preferred embodiment the epoxy resin comprises liquid epoxy resins based on diglycidyl ether of bisphenol A (DGEBA) or diglycidyl ether of bisphenol-F (DGEBF). Liquid epoxy resins typically comprise a molecular weight of less than about 500 Daltons and preferably between about 150 and 600 Daltons. A preferred method for determining molecular weight is gel permeation (or size exclusion) chromatography.

In a more preferred embodiment, the epoxy resin comprises a blend of a liquid epoxy resin and a solid epoxy resin. Examples of solid resins may include higher molecular weight versions of DGEBA and DGEBF (i.e. having a molecular weight about 400 to 4000 Daltons), multifunctional resins such as those based on epoxy novolacs or tetraglycidyl methylene dianaline (TGMDA). In a preferred embodiment of the present invention, the solid resin comprises a dicyclopentadiene epoxy novolac resin. In a most preferred embodiment of the present invention, the solid resin comprises a triphenylolmethane triglycidyl ether.

In another embodiment of the present invention, the resin matrix component comprises an acrylic material containing at least one acrylate and/or methacrylate functional group. The acrylic resin can be monofunctional, difunctional, multifunctional, or combinations thereof as long as the resulting material blend is liquid-like in nature at room temperature. Representative monofunctional acrylic resins comprise esters of (meth)acrylic acid such as methyl methacrylate, ethyl methacrylate, butyl methacrylate, methyl acrylate, butyl acrylate, cyclohexyl acrylate, hexyl acrylate, 2-ethyl hexyl acrylate, lauryl acrylate, ethyl acrylate, dicyclopentadienyloxyethyl meth acrylate, cyclohexyl methacrylate, lauryl methacrylate, glycidyl methacrylate and tetrahydrofurfuryl methacrylate (THFMA). Other monofunctional resins include OH-functional monoethylenic unsaturated monomers like 3-hydroxypropyl (meth)acrylate, 4-hydroxy butyl (meth)acrylate, 4-hydroxycyclohexyl(meth) acrylate, 1,6-hexanediol mono(meth) acrylate, neopentyl glycol mono (meth)acrylate. Further monomers known for promoting adhesion to metals include phosphorus-containing compounds with mono-esters of phosphinic, mono- and diesters of phosphonic and phosphoric acids having one unit of vinyl or allylic unsaturation present. A preferred adhesion promoter is 2-hydroxyethylmethacrylate phosphate (a.k.a. ethylene glycol methacrylate phosphate).

Representative resins comprising more than one functional group comprise epoxy dimethacrylates, epoxy diacrylates, urethane diacrylates, urethane dimethacrylates, glycol diacrylates, glycol dimethacrylates, trimethylolpropane diacrylate, trimethylolpropane dimethacrylates, polyester diacrylates, polyester dimethacrylates, cyclohexane diacryaltes, cyclohexane dimethacryaltes, trifunctional epoxy novolac acrylates, pentaerythritol tri acrylate, and dipentaerythritol pentaacrylate. In a further embodiment, the resin is comprises oligomeric derivatives of the aforementioned resins.

In an additional embodiment of the present invention, the resin comprises a blend of aliphatic urethane diacrylate and a dipentaerythritol pentaacrylate. In a more preferred embodiment, the resin comprises a blend of bisphenol A epoxy acrylate oligomer, a trifunctional epoxy novalac acrylate, and a trimethyl propane triacylate. In more preferred embodiment, the bisphenol A epoxy acrylate is approximately 50 weight percent of the total blend with the balance consisting of approximately 30% trifunctional epoxy novalac acrylate and approximately 20% trimethyl propane triacrylate. In a most preferred embodiment, the aforementioned resin blend is diluted by a small amount of metal adhesion promoter, specifically 2-hydroxyethylmethacrylate phosphate, such that the latter represents about 1% of the total mixture.

In another embodiment of the present invention, the resin matrix component comprises a urethane precursor containing at least one resin comprised of one isocyanate group and a least one resin comprised of at least one hydroxyl functional group. Both types of resins may be monomeric or polymeric in nature. Representative isocyanate resins include, without limitation, aliphatic isocyanates such as 1,6-hexamethylene diisocyanate; 1,8-octamethylene diisocyanate, 1,12-dodecamethylene diisocyanate; 2,2,4-trimethylhexamethylene diisocyanate; and the like; 3,3'-diisocyanatodipropyl ether; 3-isocyanateomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)fumarate; 4-methyl-1,3-diisocyanatocyclohexane; transvinylene diisocyanate and similar unsaturated polyisocyanates; 4,4'-methylene-bis(cyclohexylisocyanate) and related polyisocyanates; methane diisocyanates; bis-(2-isocyanatoethyl) carbonate and similar carbonate polyisocyanates; N,N'N"-tris-(6-isocyanatohexamethylene) biuret and related polyisocyanates; as well as other known polyisocyanates derived from aliphatic polyamines, aromatic polyisocyanates such as toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate; and the like.

In another embodiment of the present invention, a blocked isocyanate is employed such that the isocyanate precursor may be regenerated via application of sufficient heat. In a further embodiment the isocyanate resin also serves as a latent curative. In a preferred embodiment, the resin comprises a blocked isocyanate such that the isocyanate precursor may be regenerated via application of sufficient heat. In a more preferred, the resin comprises 4,4'-diphenylmethane-uretdione-diisocyanates ("MDI-uretdione"). In such an embodiment, the latent/blocked isocyanate is a solid and will not dissolve in the hydroxyl/polyol resins employed as the resin matrix. Therefore, the latent/blocked isocyanate is considered the latent curative in this embodiment of the present invention.

Representative monomeric and polymeric polyols include those based on ethers, esters, and butadienes. Specific examples include, but are not limited to, 1,4-butanediol, 1,3-butylene glycol; 1,6-hexane diol; 1,4-cyclohexane diol; 4,4'-methylenebis-(cyclohexanol); glycerol; trimethylolpropane; 1,2,6-hexanetriol; erythritol; pentaerythritol; neopentyl glycol; polycaprolactone diols and triols, poly(tetramethylene adipate) diol; polyethylene succinate) diol; poly(1, 3-butylene sebacate) diol; poly(butadiene) diols; hydroxylated poly(butadiene) dienes; and (1,3-butylene glycol/glycerine/adipic acid/isophthalic acid) diol and triols. In a preferred embodiment, the hydroxyl containing resin comprises a resole. In more preferred embodiment, the hydroxyl containing resin comprises a blend of a resole and diallyl bisphenol A. In the most preferred embodiment, the hydroxyl containing resin comprises a blend of a resole, diallyl bisphenol A, and adduct of diglycidyl ether of bisphenol and a carboxylic acid terminated butadiene acrylonitrile copolymer.

In another embodiment of the present invention, the resin matrix comprises a phenolic resin. Suitable phenolic resins comprise heat-reactive condensation products of an aldehyde having from 1 to 8 carbon atoms, such as formaldehyde, acetaldehyde, isobutyraldehyde, ethylhexaldehyde, and the like, with phenolic compounds such as phenol, o-cresol, m-cresol, p-cresol, mixed cresols, e.g., cresylic acid and m-cresol and/or p-cresol, xylenol, diphenylolpropane, p-butylphenol, p-tert-amylphenol, p-octylphenol, p,p'-dihydroxydiphenylether, and the like.

In one embodiment of the present invention, the phenolic resin will preferably be formed in a conventional manner from the condensation of from about 0.8 to about 5 mols of aldehyde per mol of phenolic compound in the presence of basic, neutral or acidic catalysts to afford an organic solvent-soluble resin having a molecular weight in the range from about 300 to about 2,000, preferably about 300 to about 1,200.

The entanglement polymer comprises a long chain, high molecular weight polymer that is able to form physical entanglements with itself or the other components of the adhesive. It is believed that this entanglement enhances the cohesive strength of the uncured film while maintaining compatibility with the resin component(s). Moreover, the entanglement polymer may also possess functional groups capable of providing substantial non-covalent interactions, e.g. hydrogen bonding, that further increase the cohesive strength of the uncured film. These entanglement polymers preferably comprise a high molecular weight with a number average molecular of at least 4000 Daltons, and more preferably at least 8000 Daltons, and more preferably at least 15,000 Daltons, and most preferably at least 100,000 Daltons. In a preferred embodiment the entanglement polymer comprises a solid at room temperature and contains chemical moieties capable of reacting with at least one of the resin matrix component, latent curative, optional elastomer crosslinker, the metal substrate, or the elastomer substrate. The entanglement polymer is selected so as to be compatible with the resin matrix, i.e. is at least partially soluble, and provides a balance of viscoelastic properties resulting in a dimensionally stable, yet tacky, film adhesive.

In one preferred embodiment of the present invention, the entanglement polymer comprises a carboxylated nitrile rubber, chlorinated natural rubber, epoxy terminated phenoxy polymer, an epoxy-rubber adduct, or combinations thereof. In a preferred embodiment of the present invention, the entanglement polymer comprises an unsaturated polymer such as chlorosulfonated polyethylene, hydrogenated nitrile butadiene rubber (HNBR), polyacrylate elastomers, polyvinyl acetal, or epichlorohydrin homopolymers and copolymers, including but not limited to an ethylene oxide/epichlorohydrin/allyl glycidyl ether terpolymer, or combinations thereof or in combination with those enumerated above. In another preferred embodiment of the present invention, the entanglement polymer comprises reactive sites capable of reacting with at least one other constituent of the film. In a further embodiment of the present invention, the entanglement polymer comprises at least one of a homopolymer, block copolymer or a random copolymer.

In a preferred embodiment of the present invention, the entanglement polymer comprises a block copolymer in which at least one block is soluble in the resin matrix. The block copolymer can be a diblock (A-B), triblock (A-B-A, or A-B-C), or star configuration, where A represents a polymer that is chemically dissimilar than polymer B and polymer C, and A, B, and C, are linked by a covalent bond. Examples of block copolymers include, but are not limited to, those with A blocks based on styrene and/or methylmethacylate and B blocks based on butadiene, isoprene, or hydrogenated versions thereof. Additional examples include block copolymers comprised of polyethene oxide and polypropylene oxide blocks. In another embodiment, the block copolymer may be used in conjunction with an entanglement polymer that is classified as a homopolymer. In a further embodiment, either A or B block may contain a small portion of a third monomer to improve solubility within the resin matrix or a means of crosslinking with the resin matrix and/or latent curative.

In a preferred embodiment of the present invention, the entanglement polymer comprises a halogenated polyolefin. In a most preferred embodiment of the present invention, the halogenated polyolefin comprises chlorinated and/or brominated polypropylene, polybutylene, or poly-butadiene type polyolefins such as poly(2,3-dichlorobutadiene), brominated poly(2,3-dichlorobutadiene), and poly(2,3-dichlorobutadiene) copolymers, hexachlorocyclopentadiene adducts of unsaturated polyolefins, chlorosulfonated polyethylene, chlorinated polyethylene, chlorinated polyisoprene, and the like.

The butadiene monomers useful for preparing the butadiene polymer can be any monomer containing conjugated unsaturation. Typical monomers include 2,3-dichloro-1,3-butadiene; 1,3-butadiene; isoprene; 2,3-dimethylbutadiene; chloroprene; bromoprene; 2,3-dibromo-1,3-butadiene; 1,1,2-trichlorobutadiene; cyanoprene; hexachlorobutadiene; and combinations thereof. As described above, an especially preferred embodiment of the present invention is one wherein the butadiene polymer includes at least 60 weight percent, preferably at least 70 weight percent, 2,3-dichloro-1,3-butadiene monomer units.

In a further embodiment of the present invention, the butadiene monomer can be copolymerized with other monomers to enhance bond strength and achieve a Tg or melting point within the necessary range. Such copolymerizable monomers include α-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; α-bromovinylketone; vinylidene chloride; vinyl toluenes; vinylnaphthalenes; vinyl ethers, esters and ketones such as methyl vinyl ether, vinyl acetate and methyl vinyl ketone; esters amides, and nitriles of acrylic and methacrylic acids such as ethyl acrylate, methyl methacrylate, glycidyl acrylate, methacrylamide and acrylonitrile; and combinations of such monomers.

The copolymerizable monomers, if utilized, are preferably those which provide functionality to enhance crosslinking between the film and the elastomer. In a further preferred embodiment of the present invention, the copolymerizable monomer comprises α-haloacrylonitrile and/or α,β-unsaturated carboxylic acids. In an additional embodiment of the present invention, the copolymerizable monomers are generally employed in an amount of 0.1 to 15 weight percent, based on the weight of the total monomers utilized to form the butadiene polymer.

The latent curative comprises a material that is stable at room temperature, yet capable of curing the film at higher temperatures. For the purposes of this invention, "latent" referred to a substantially non-reactive, or very slow to react, material at room temperature, about 25° C., for an extended period of time, typically weeks to months. In a preferred embodiment of the present invention, the latent curative is nonreactive in the film adhesive for at least seven days at temperatures below, 40° C., and more preferably at temperatures below 50° C. In another preferred embodiment of the present invention, the latent curative reacts to substantially cure the film adhesive within about 24 hours at temperatures above 80° C., preferably above 60° C.

The latent curative is cable of reacting at least one of, but not limited to, the following functional groups that may be present in the resin matrix and/or entanglement polymer: epoxy, acrylate, methacrylate, vinyl, carboxy, amine, thiol, isocyanate, hydroxyl, anhydride, and amide.

Preferred latent curatives comprise at least one of dicyandiamide, substituted urea, or dinitrosobenzene (DNB), sulfur with or without sulfur accelerators/activators, maleimides including bis-maleimides, or a combination of p-benzoquinone dioxime and an oxidizer such as peroxide, and preferably combinations thereof. Additional latent curatives comprise amines, imidazoles, iodonium salts, anhydrides, and Lewis acids. Particularly preferred latent curatives include materials such as dinitrosobenzene or maleimides which are known elastomer crosslinkers and will react and or crosslink the elastomeric substrate as well as the film adhesive.

In one embodiment of the present invention, the resin matrix comprises an epoxy resin and the latent curative comprises at least one of dicyandiamide with or without an accelerator such as a substituted urea such as cycloaliphatic bisurea, 4,4 Methylene bis (aromatic substituted urea), or toluene bis dimethyl urea. Further latent epoxy curatives include solid amine adducts, such as cyclic polyamidoamine, modified aliphatic and aromatic amines, imidazoles, and the like. Appropriate sulfur accelerators include benzothiazyl disulfide, zinc dimethyldithiocarbamate, 4,4'-dithiodimorpholine, tetramethylthiuram, N-oxydiethylene 2-benzothiazole-sulfenamide, and the like.

In an embodiment comprising acrylic based resin matrix, preferred latent curative include peroxides such as dibenzyl peroxide, and dicumyl peroxide, and primary or secondary amines. In an embodiment of the present invention comprising a urethane based resin matrix, preferred curatives comprise zinc acetylacetonate hydrate, tin and amine based catalysts, and dinitrosobenzene. Additionally, in an embodiment of the invention comprising polyols as the resin matrix, the latent accelerator comprises blocked isocyanate.

In one embodiment of the present invention, the amount of latent curative will vary depending upon the resin matrix used as well as the reactivity of the entanglement polymer. Additionally, in embodiments of the present invent, it is desired to employ more than one latent curative.

In another embodiment of the present invention, in order to achieve sufficient bonding to the elastomer, at least one constituent material must have elastomer bonding moieties. This functionality may result from the resin matrix or reactive sites on the entanglement polymer, however typically this functionality is introduced through the latent curative which in addition to curing the resin matrix can also crosslink with the elastomer substrate. In embodiments of the present invention where the latent curative or other constituents do not provide this functionality, a separate elastomer crosslinker is provided. This elastomer crosslinker preferably comprises sulfur, a bis-maleimide, or dinitrosobenzene. In a preferred embodiment of the present invention the elastomer bonding crosslinker comprises dinitrosobenzene. Thus, if dinitrosobenzene is not employed as a latent curative, it may be added as a rubber crosslinker component, even though it will perform both functions.

Additionally, the relative amounts of the key constituents will vary relative to one another depending upon the particular chemistries employed as well as the desired properties of the film adhesive. In one embodiment of the present invention, the resin matrix is present from about 40 to about 75 weight percent based on the total weight of the resin matrix, entanglement polymer and latent curative, preferably 50 to 70 weight percent, and most preferably about 60 weight percent. In another embodiment of the present invention, the entanglement polymer is present from about 10 to about 40 weight percent based on the total weight of the resin matrix, entanglement polymer and latent curative, preferably 15 to 25 weight percent, and most preferably about 20 weight percent. In a further embodiment, the latent curative is present from about 5 to about 50 weight percent based on total weight of the resin matrix, entanglement polymer and latent curative, preferably 5 to 15 weight percent, and most preferably about 10 weight percent.

In one embodiment of the present invention, the film is employed as a complete adhesive system to bond an elastomer to a substrate. This provides a "one-coat" system were the use of additional bonding materials traditionally employed, such as separate primer or adhesive layers, may be eliminated.

In another embodiment of the present invention, the film is employed as an adhesive film in conjunction with a traditional primer to bond an elastomer to a substrate with the adhesive film on the elastomer side and the primer applied to the substrate. In a preferred embodiment, the substrate comprises a metallic substrate and the primer provides corrosion protection to the metallic substrate as well as engaging in the adhesive process.

In a further embodiment of the present invention, the film is employed as a primer applied to a substrate and a separate adhesive layer is employed between the film and elastomer. In this embodiment the film preferably comprises a latent film curative to cure the film, however this film does not require crosslinking to the elastomeric substrate. In a still further embodiment of the present invention, the film adhesive comprises a bi- or multi-layer film with a primer film laminated to an adhesive film so as to provide rigid substrate bonding characteristics to one side and elastomer bonding characteristics to a second side.

In another embodiment of the present invention, the film comprises a bilayer film comprising a first layer comprising a film adhesive as described in the various embodiments herein, and a second layer comprising an elastomer. Some elastomeric substrates contain curatives, antioxidants, antiozonants, and other additives that hinder the ability of the film adhesive to adhere to the elastomeric substrate. The elastomer layer is provided as a thin layer of elastomer, preferably of an elastomer matching or similar to the elastomer substrate, but without the deleterious additives. In this manner, the thin elastomer layer provides a protective layer to the film adhesive to keep harmful elastomer additives from interfering with the adhesive. The thin elastomer layer must be thin enough to allow the film adhesive's elastomer crosslinker or other elastomer-substrate bonding constituents to migrate through the thin layer and bond to the elastomer substrate.

In another embodiment of the present invention, the film adhesive comprises the constituent materials as described in the various embodiments herein, however one activating component is eliminated from the film and applied directly to the rigid substrate. When the film adhesive is brought into contact with the rigid substrate coated with the activating component, the cure can proceed. For example in one embodiment of the invention with the resin matrix comprising an acrylic resin, the peroxide initiator is not included in the film adhesive, but rather applied to the rigid substrate to initiate bonding upon contact with the film adhesive. In another exemplary embodiment of the present invention wherein the resin matrix comprises a polyol, the isocyanate component is applied to the rigid substrate.

In a further embodiment of the present invention, the film comprises a web or veil to enhance cohesiveness and handling performance. In an additional embodiment of the present invention, the film is employed as a primer in conjunction with a separate adhesive layer, which may or may not be a film.

In one embodiment of the present invention, traditional additives such as metal or elastomer adhesion promoters, such as silanes/organosilanes are employed as well as optionally chelating agents. In a further embodiment of the present invention, the film comprises other additives, cure accelerators, activators, acid scavengers, conductive and non-conductive fillers, pigments, rheology modifiers, and the like, including treated or untreated fumed silica, carbon black, titanium dioxide, zinc oxide, magnesium oxide, and the like.

In a further preferred embodiment of the present invention, the adhesive film comprises a conductive filler. This embodiment of the present invention provides an adhesive film that exhibits a unique combination of properties, namely, high tack and strength in the uncured state and high thermal conductivity and high glass transition temperature in the cured state curing. The film is comprised of a blend of di- and multi-functional liquid and solid epoxies, a reactive nitrile, and thermally conductive, electrically insulating fillers who size and volume are chosen to minimize viscosity (flow during cure) while maximizing thermal conductivity. These properties could serve use in/enable applications like lightweight deicing systems that require high heat transfer and adhesion between an aluminum face plate and an electric heater assembly.

The films of an embodiment of the present invention may be constructed by casting a solution of the film ingredients in a volatile solvent onto a release liner (e.g. silicone-treated polyethylene terephthalate (PET)) via a number of common film forming methods (e.g., roll-to-roll processing, slot-die extrusion, etc.). The cast solution is then conveyed briefly through a convection oven to remove the volatile solvent; thereby forming the film per the present invention. Optionally, a reinforcing non-woven or woven veil may be incorporated into the film either by integrating the film-solvent solution into the veil or by pressing the veil into the oven-dried film via nip rollers. Film adhesives of the embodiments of the present invention are preferably less than 10 mils in thickness, and most preferably 1-8 mils in thickness.

In a further preferred embodiment of the present invention, the reaction of the adhesive with the substrates, especially with that of the rubber substrate, is activated by a heat curing process. Examples of such process consist of, but are not limited to, compression molding, transfer molding, injection molding, open air (via heat convection), open steam, water immersion, and autoclave curing.

In a further embodiment of the present invention, the films of the present invention are employed to bond elastomer which has already been vulcanized. While elastomer bonding is preferably achieved concurrently with the vulcanization/curing of the elastomer substrate, there are applications where co-curing an adhesive with the rubber is impractical or impossible. For example, during the manufacture of parts such as certain mounts and bushings, bonding must take place after the rubber part has been formed and vulcanized. In some circumstances, post-vulcanization rubber-to-substrate bonding can also provide significant cost advantages compared to concurrent bonding. In these instances, it is necessary to form a bond between the vulcanized rubber and a rigid substrate such as metal.

In one embodiment of the present invention, the adhesive film provides many advantages over conventional liquid or paste adhesives. The solid, film-form of the adhesive provides application advantages such as being immediately ready to use without mixing or risk of settling, adhesive remaining in place after application, bond lines have uniform thickness, application can be very precise to geometries and widths, or even die cut to conform to unusual geometries.

Further, these adhesive films are very high performance adhesives providing high strength, high fatigue resistance, and high temperature resistance, and are especially suited for bonding and laminating large areas.

While there are many end-uses for the adhesive films of the embodiments of the present invention, these materials are particularly advantageous in rubber-to-substrate applications such as seismic and/or bridge bearing pads, rubber track crawlers, rubber rollers, tire construction, hoses, rail road friction pads, seals and gaskets, bushings, oil and gas stators, and the like. Further, the adhesives films may be employed with a tie-layer between the adhesive and elastomeric substrate, or a tack layer between the adhesive and the metal substrate.

In a further embodiment of the present invention, the adhesive films may be provided through a number of means to facilitate make manufacturing and application processes. For example, the adhesive films may be pre-applied to one or both of the substrates such as laminating or calendaring onto a rubber part. In this way, the adhesive may be manufactured integral to one substrate, such as a rubber sheet/roll, and transported along with said part. Upon final assembly the laminated/calendared rubber and adhesive substrate is then joined with and adhesively boned to the second substrate. Advantageously, in this embodiment of the present invention, the adhesive comprises sufficient tack or adhesive strength to effect lamination of the solid film adhesive to a first substrate at a temperature without fully, or preferably even partially, curing the solid film adhesive. Upon joining with the second substrate, the film adhesive is then heated to complete the curing of the solid film adhesive and adhesively bonding the two substrates.

In preferred embodiments of the present invention, the films provide a roll-stable coated film adhesive that exhibits an ambient shelf-life of over 3 months and a thermally stable initiating system that can be processed (e.g. coated, dried, and/or heat laminated to one substrate or between two substrates) without inducing thermal cure at temperatures below about 120° C.; rapid activation through heating above about 120° C.; some tack during application to the second substrate to exhibit a period of extended latency (i.e. long delayed cure/open time) such that the adhesive can still be processed (e.g. bonded to one or more substrates) minutes or more after final application; and an activation reactivity that facilitates extensive curing to a thermoset adhesive during a subsequent curing cycle at temperatures above the cure temperature.

In another illustrative example the adhesive films may be formed with a bi- or multi-layer construction with the adhesive integrated into a laminate structure able to provide a multitude of properties to the structure. For example, co-laminating the adhesive with an elastomeric substrate would allow an end user to quickly apply the adhesive-laminated rubber to a second substrate and cure the assembly. This would eliminate separate adhesive application steps at the point of final use.

In an additional embodiment of the present invent, the film adhesives may be die cut or otherwise formed into particular geometries to more readily fit the dimensional characteristics of their intended use.

In an exemplary production process, a solid film adhesive in accordance with exemplary embodiments coated on a release liner is heat roll laminated to a first substrate (i.e., a first surface of the film is adhered to the first substrate while an opposing second surface of the film remains covered by the release liner on which the film was originally coated). Even after initial processing, the solid film adhesive has a shelf life of at least 24 hours, typically at least seven days, and more typically at least three months without curing. When ready for use, the film adhesive is then exposed to heat.

Although the present invention has been described with reference to particular embodiments, it should be recognized that these embodiments are merely illustrative of the principles of the present invention. Those of ordinary skill in the art will appreciate that the compositions, apparatus and methods of the present invention may be constructed and implemented in other ways and embodiments. Accordingly, the description herein should not be read as limiting the present invention, as other embodiments also fall within the scope of the present invention as defined by the appended claims.

EXAMPLES

Example 1

This example demonstrates the effect of cure conditions on an epoxy-based primer film employed to bond steel to natural rubber along with a traditional rubber bonding adhesive. Carboxylated nitrile rubber crumb (Nipol 1472X, Zeon Chemicals) at a concentration of 25% by weight was dissolved in methyl ethyl ketone (MEK) by rolling the mixture in a large glass jar for at least 12 hours. Tetraglycidyl methylene dianiline, TGMDA, (MY-720, Huntsman) was preheated to 100° C., combined with diglycidylether of bisphenol A, DGEBA, (EPON 828, Momentive) and thoroughly mixed until the resins were fully dissolved. The nitrile rubber/MEK solution, TGMDA, and DGEBA, were added to a polypropylene cup according to the concentrations of Table 1. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) and aromatic substituted urea (U-410M, CVC Thermoset Specialties) were then added to the mixture at levels of 8 and 5 phr, respectively, based on the epoxy resin content. The mixture was further mixed using a DAC 800 Hauschild mixer at 1950 RPM for 1 minute. The mixing was repeated at least once to ensure adequate mixing of the contents of the cup.

Films were cast on silicone-treated polyethylene terephthalate (PET) release liners using an automated drawdown table and a 7 mil, Bird-style casting bar at a casting speed of 25 mm/s. Immediately after casting the film, a 12 gsm non-woven PET spunbond veil was then gently placed on the exposed surface of film followed by the placement of a temporary release liner. The veil was then pressed into place using a 4 pound rubber hand roller. The laminate was cooled in dry ice for approximately 5 minutes to enable the release of the top temporary release liner. Once the temporary release liner was removed the film was placed into a preheated oven (Temp=50° C.) for 20 minutes to remove any residual solvent.

Cold-rolled steel (CRS) coupons, 1.0 inch wide by 2.5 inch long by 0.0625 in thick, were grit blasted with 24 grit aluminum oxide in preparation for bonding. The coupons were then solvent wiped six times with a clean rag and MEK followed by 6 times with a clean rag and xylene. The test coupons were then allowed to dry for 15 min at room temperature. Three metal coupons per test (tack, open steam, autoclave steam, and compression cure) were then masked off at the top and bottom leaving a 1 inch×1 inch square exposed for bonding. The film was then cut into 1 inch wide strips and placed cast side down on the exposed metal coupon surface. The temporary release liner on the back side of the film was left in place during film application to the metal surface. The films were pressed by hand to remove voids between the film and metal coupon surface. Natural soft rubber (Enduraflex™ VE611BN rubber, a commercially available low sulfur cure rubber) was cut into 3.5 inch wide×6 inch long×0.25 inch thick sections for bonding with the metal coupons and film. The liner was removed to expose one side of each natural rubber sample and Chemlok® 236A rubber adhesive (available from LORD Corporation) was roll applied to half of the exposed natural rubber surface. The Chemlok 236A adhesive was allowed to dry for 15 min at room temperature after application. For compression cure, milled natural rubber stock (HC-130, a heat-resistant semi-EV natural rubber from LORD Corporation) was used in place of the Enduraflex VE611BN rubber.

For tack evaluation, one group of three coupons was applied to the coated side of the natural rubber sample so that the exposed film was placed in contact with the Chemlok 236A adhesive coated rubber surface. The metal coupon/film laminate was then forcefully adhered to the rubber surface by applying a 25 pound weight to the back side of the metal coupons for 5 seconds. The metal coupon/film/236A/rubber assembly was then flipped over and the weight was applied to the rubber side of the assembly for a further 5 seconds. The rubber was then cut so that three 1 inch×6 inch test specimens were obtained (1 test specimen per metal coupon). An MTS Systems Corporation tensile testing machine equipped with three load cells and 90° peel jigs were used to test the tack and cured bond strength of the test specimens according to ASTM D429. The metal coupon was loaded into the lower sample holder and the rubber strip was placed in the upper grips at a 90° angle to the metal coupon. The upper grips were then moved upward at a constant rate of 2 inch/min and the force to remove the rubber from the metal coupon was recorded. The maximum force required to remove the rubber strip from the 1 in square area of the metal coupon was then reported for strength in units of pounds per linear inch (pli). The average pli was computed from the three specimens.

For cured bond strength evaluation, three coupons per cure schedule were applied to the coated side of the natural rubber substrates so that the exposed film was placed in contact with the Chemlok 236A (LORD Corporation) adhesive coated rubber surface. The metal coupon/film laminate was then forcefully adhered to the rubber surface by rolling the rubber side of the assembly with a 0.25 in wide metal rubber roller. A crosshatch pattern was used to ensure good contact between the metal coupon/film to the 236A/natural rubber sample. Samples for compression cure were not forcefully laminated to the rubber surface using the rubber roller. The resulting assembly was then cured using one of three cure schedules:

Cure 1 (Open Steam Cure)—Assemblies were placed on a rack in a sealed metal chamber which filled with saturated steam at atmospheric pressure for 24 hrs (steady state temperature=~180° F./82° C.)

Cure 2 (Autoclave Steam Cure)—Assemblies were placed on a rack in an autoclave which subsequently filled with saturated steam at 8 psi for 6 hrs (steady state temperature=~240° F./116° C.)

Cure 3 (Hot Compression Cure)—Assemblies based on HC-130 natural rubber stock instead of Enduraflex VE611BN were placed between two, 18 inch by 18 inch platens (preheated to 340° C./171° C.) and cured for 16 minutes under 20 tons of force using a Wabash G30H-18-BX compression molder.

After cure, the cured rubber was then cut so that three 1 inch by 6 inch test specimens were obtained for each cure schedule. The peel strength was measured in the same manner listed above.

TABLE 1

Resins and entanglement polymers used form a primer film

| Raw Ingredient | Role | Weight percent |
|---|---|---|
| Diglycidylether of bisphenol A (DGEBA) Resin (EEW = 185-192. MW = ~380) | Liquid Resin | 34.2 |
| Tetraglycidyl methylene dianiline (TGMDA) (EEW = 117-134, MW = ~500) | Solid Resin | 36.2 |
| Carboxyated Nitrile Rubber (acrylonitrile content = 27%, Mooney Viscosity = 22-35) | Entanglement Polymer | 20.4 |
| Dicyandiamide | Latent curative | 5.6 |
| Aromatic substituted urea | Accelerator for latent curative | 3.5 |
| Total | | 100 |

TABLE 2

Tack and cured peel strength values of rubber/cold-rolled steel substrates bonded using Example 1 epoxy-based primer film and Chemlok 236A adhesive.
Peel Strength Results (pli)

| Uncured - Tack | Open Steam Cure | Autoclave Steam Cure | Hot Compression Cure |
|---|---|---|---|
| 4.0 | 49.7 | 97.3 | 34.3 |

Table 2 shows that substantial levels of tack (i.e. similar to Scotch® tape) are achievable when the Example 1 film is used as metal primer with Chemlok 236A adhesive to bond cold-rolled steel to natural rubber substrates. Similarly, substantial cured peel strengths are also achieved especially when curing the assembly via autoclave steam.

Examples 2-6

Table 3 provides compositional details for Examples 2-6 which show the effect of resin system of an epoxy-based primer film on tack and cured peel strength values of rubber/cold-rolled steel substrates bonded with Chemlok 236A adhesive. The films were prepared according to Cure 3 described in Example 1. Preparation of each primer film are as follows: Example 2 involved first separately dissolving the carboxylated nitrile rubber crumb (Nipol 1472X, Zeon Chemicals) and epoxy terminated, phenoxy resin (JER 1256, Japanese Epoxy Resins Co.) in MEK at concentrations of 33% and 25% by weight, respectively. Each solution was rolled in a large glass jar for at least 12 hours to ensure full dissolution of the polymer in the solvent. The nitrile rubber/MEK solution, phenoxy/MEK solution, and DGEBA (EPON 828, Momentive) were added to a polypropylene cup at concentrations according to Table 3. The cup and its contents were mixed using a DAC 800 Hauschild mixer at 1950 RPM for 1 minute. The mixing was repeated at least once to ensure adequate mixing of the contents of the cup.

Example 3 involved first dissolving carboxylated nitrile rubber crumb (Nipol 1472X, Zeon Chemicals), 25% by weight, in MEK by rolling the mixture in a large glass jar for at least 12 hours. Dicyclopentadiene epoxy novolac (Tactix 556, Huntsman) was then preheated to 100° C., combined with DGEBA (EPON 828, Momentive) and thoroughly mixed until the resins were fully dissolved. The nitrile rubber/MEK solution and the epoxy novolac/DGEBA solutions were added to a polypropylene cup at concentrations according to Table 3. The cup and its contents were mixed using a DAC 800 Hauschild mixer at 1950 RPM for 1 minute. The mixing was repeated at least once to ensure adequate mixing of the contents of the cup.

Example 4 involved first dissolving carboxylated nitrile rubber crumb (Nipol 1472X, Zeon Chemicals), 25% by weight, in MEK by rolling the mixture in a large glass jar for at least 12 hours. Tetraglycidyl methylene dianiline, TGMDA, (MY-720, Huntsman) and dicyclopentadiene epoxy novolac (Tactix 556, Huntsman) were then preheated to 100° C., combined with DGEBA (EPON 828, Momentive), and thoroughly mixed until the resins were fully dissolved. The nitrile rubber/MEK solution and the TGDMA/epoxy novolac/DGEBA mixture were added to a polypropylene cup at concentrations according to Table 3. The cup and its contents were mixed using a DAC 800 Hauschild mixer at 1950 RPM for 1 minute. The mixing was repeated at least once to ensure adequate mixing of the contents of the cup.

Example 5 involved first dissolving carboxylated nitrile rubber crumb (Nipol 1472X, Zeon Chemicals), 33% by weight, in MEK and by rolling the mixture in a large glass jar for at least 12 hours. Tetraglycidyl methylene dianiline, TGMDA, (MY-720, Huntsman) was preheated to 80° C. and combined with nitrile rubber/MEK solution at concentrations of according to Table 3. The mixture was immediately mixed using a DAC 800 Hauschild mixer at 1950 RPM for 1 minute. A phenol-formaldehyde resin was next added to the mixture and mixed at 1950 RPM for 1 minute. Dicyclopentadiene epoxy novolac (Tactix 556, Huntsman) was preheated to 80° C. added to the mixture and mixed at 1950 RPM for 1 minute.

To each of aforementioned resin blends (Examples 2-5), dicyandiamide (DDA 10, CVC Thermoset Specialties) and aromatic substituted urea (U-410M, CVC Thermoset Specialties) were added to the mixture at nominal levels of 8 and 5 phr, respectively, based on the epoxy resin content. The mixture was further mixed using a DAC 800 Hauschild mixer at 1950 RPM for 1 minute. The mixing was repeated at least once to ensure adequate mixing of the contents of the cup.

Example 6 involved first dissolving epoxy-terminated, phenoxy resin (JER 1256, Japanese Epoxy Resins Co.) in MEK at a concentration of 40% by weight. The phenoxy resin/MEK solution, phenol-formaldehyde resin, DGEBA (EPON 828, Momentive), and polydimethylsiloxane-treated fumed silica (TS-720, Cabot) were added to a polypropylene cup at concentrations according to Table 3. The blend was mixed using a DAC 800 Hauschild mixer at 1950 RPM for 1 minute. The mixing was repeated at least once to ensure adequate mixing of the contents of the cup. This formulation contained no dicyandiamide and aromatic substituted urea.

All films were cast and prepared according the procedure reported in Example 1. The thickness of the Bird bar was nominally 7 mils (wet-thickness); however more or less thick bars were used to target a dry film thickness of 5 mils. The films of Examples 2-5 contain a non-woven PET spunbond veil as reported in Example 1 while Example 6 contained a 6 g/m2 non-woven E-glass veil. Test specimens were prepared and evaluated according to the procedure in Example 1 for tack strength and compression cured bond strength.

TABLE 3

Resins, entanglement polymers and fillers for epoxy-based primer films.

| Raw Ingredient | Role | 2 | 3 | 4 | 5 | 6 |
|---|---|---|---|---|---|---|
| | | \multicolumn{5}{c}{Weight Percent} | | | | |
| Phenol-formaldehyde resin | Resin | — | — | — | 23.4 | 49.4 |
| Diglycidylether of bisphenol A (DGEBA) Resin (EEW = 185-192. MW = ~380) | Resin | 59.2 | 35.0 | 34.2 | — | 30.9 |
| Dicyclopentadiene Epoxy Novalac (DCPEN) Resin (EEW = 215-235, MW = ~495) | Resin | — | 35.0 | — | 23.7 | — |
| Tetraglycidyl methylene dianiline(TGMDA) (EEW = 117-134, MW = ~500) | Resin | — | — | 36.2 | 23.4 | — |
| Epoxy terminated Phenoxy polymer (EEW = ~7800, Mw = 51,000, Mn = 10,000) | Entanglement Polymer | 11.8 | — | — | — | 18.5 |
| Carboxyated Nitrile Rubber (acrylonitrile content = 27%, Mooney Visco = 22-35) | Entanglement Polymer | 21.3 | 20.9 | 20.4 | 23.4 | — |
| PDMS Treated Fumed Silica | Rheology Modifier | — | — | — | — | 1.2 |
| Dicyandiamide | Latent curative | 4.7 | 5.6 | 5.6 | 3.7 | — |
| Aromatic substituted urea | Accelerator for latent curative | 3.0 | 3.5 | 3.5 | 2.3 | — |
| Total | | 100 | 100 | 100 | 100 | 100 |
| | | \multicolumn{5}{c}{Peel Strength Results (pli)} | | | | |
| Uncured - Tack[a] | | 2.4 | 1.7 | 4.0 | 7.2 | 0.5 |
| Hot Compression Cure[b] | | 25.0 | 37.0 | 34.3 | 46.3 | 50.7 |

[a]Substrates = CRS, 0.25" thick natural rubber (Enduraflex VE611BN), film used as a primer and cured with Chemlok 236A adhesive
[b]Substrates = CRS, LORD HC130 NR Stock, film used as a primer and cured with Chemlok 236A adhesive Example 2 showed that the use of two entanglement polymers with a resin matrix gives moderate tack levels and cured bond strengths. Example 3 showed similar behavior by employing a blend of solid and liquid epoxy resins and carboxylated nitrile, entanglement polymer. Higher levels of tack were demonstrated by using a tetrafunctional solid resin while maintaining cured bond strength as seen in Example 4. Even higher levels of tack and cured bond strength were achieved in Example 5 using a combination of liquid DGEBA resin, two solid, multifunctional epoxy resins, and a carboxylated nitrile rubber as the entanglement polymer. Lastly, even higher levels of cured bond strength were demonstrated when using a phenol-formaldehyde resin, liquid epoxy, and a phenoxy entanglement polymer cured in the absence of dicyandiamide and urea catalyst; however, tack levels were negligible.

Examples 7-8

Examples 7 and 8 demonstrate the use of a film adhesive to bond steel to natural rubber. Example 7 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. Tetraglycidyl methylene dianiline, TGMDA, (MY-720, Huntsman) was preheated to 100° C., combined with diglycidylether of bisphenol A, DGEBA, (EPON 828, Momentive) and thoroughly mixed until the resins were fully dissolved. The nitrile rubber/MEK solution, TGMDA, and DGEBA, were added to a polypropylene cup according to the concentrations of Table 4. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) and aromatic substituted urea (U-410M, CVC Thermoset Specialties) were then added to the mixture at levels of 8 and 5 phr, respectively, based on the epoxy resin content. The mixture was further mixed using a DAC 800 Hauschild mixer at 1950 RPM for 1 minute. The mixing was repeated at least once to ensure adequate mixing of the contents of the cup. In order to reduce viscosity, 10% by weight toluene was added to the formulation and mixed at 1950 RPM for 1 minute. Dinitrosobenzene in powder form was added to formulation and mixed at 1950 RPM for 1 minute.

Example 8 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. Similarly, chlorosulfonated polyethylene (TS-340, Tosoh Corporation) was dissolved at a concentration of 50% by weight in MEK. Tetraglycidyl methylene dianiline, TGMDA, (MY-720, Huntsman) was preheated to 100° C., combined with diglycidylether of bisphenol A, DGEBA, (EPON 828, Momentive) and thoroughly mixed until the resins were fully dissolved. The nitrile rubber/MEK solution, chlorosulfonated polyethylene/MEK solution, TGMDA, and DGEBA, were added to a polypropylene cup according to the concentrations of Table 4. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) and aromatic substituted urea (U-410M, CVC Thermoset Specialties) were then added to the mixture at levels of 8 and 5 phr, respectively, based on the epoxy resin content. The mixture was further mixed using a DAC 800 Hauschild mixer at 1950 RPM for 1 minute. The mixing was repeated at least once to ensure adequate mixing of the contents of the cup. In order to reduce viscosity, 10% by weight toluene was added to the formulation and mixed at 1950 RPM for 1 minute. Dinitrosobenzene in powder form, was added to formulation and mixed at 1950 RPM for 1 minute.

The films for Examples 7 and 8 were cast and prepared according the procedure reported in Example 1. The thickness of the Bird bar was 7 mils (wet-thickness); which equated to dry film thickness of approximately 5 mils. Test specimens were prepared, cured using Cures 1, 2, and 3, and tested according to the procedures in Example 1; however, the liquid rubber adhesive used in the prior example was omitted and no other materials were applied to the substrates prior to assembling the metal coupon/film/coupon.

TABLE 4

Compositional details and peel strength values obtained on epoxy-based films when used to directly natural rubber to cold-rolled steel.

| Raw Ingredient | Role | 7 | 8 |
|---|---|---|---|
| | | Weight percent | |
| Diglycidylether of bisphenol A (DGEBA) Resin (EEW = 185-192. MW = ~380) | Liquid Resin | 28.0 | 21.7 |
| Tetraglycidyl methylene dianiline(TGMDA) Resin (EEW = 117-134, MW = ~500) | Solid Resin | 28.0 | 21.7 |
| Chlorosulfonated Polyethylene (Cl content = 43% 1.1 sulphur content = 1.1%, Mooney Viscosity in 25% toluene = 300-500 cps) | Entanglement Polymer | — | 6.5 |
| Carboxyated Nitrile Rubber (acrylonitrile content = 27%, Mooney Visco = 22-35) | Entanglement Polymer | 16.8 | 6.5 |
| Dicyandiamide | Latent curative | 4.5 | 3.5 |
| Aromatic substituted urea | Accelerator for latent curative | 2.8 | 2.2 |
| Dinitrosobenzene | Latent curative/ Elastomer crosslinker | 20.0 | 37.8 |
| Total | | 100 | 100 |
| | | Peel Strength Results (pli) | |
| | Uncured - Tack[a] | 8.1 | 6.0 |
| | Open Steam Cure[a] | 35.0 | 25.0 |
| | Autoclave Steam Cure[a] | 48.3 | 30.3 |
| | Hot Compression Cure[b] | 40.4 | 37.2 |

[a]Substrates = CRS, 0.25" thick natural rubber (Enduraflex VE611BN), Film used as a primer and cured with Chemlok 236A adhesive
[b]Substrates = CRS, LORD HC130 NR Stock Example 7 shows that use of a liquid epoxy resin, a solid tetrafunctional epoxy resin, carboxylated nitrile entanglement polymer and two latent curatives, namely dicyandiamide and dinitrosobenzene, enabled adhesive films that exhibit high levels of teach and cured bond strength when used to bond natural rubber and cold-rolled steel substrates. As previously noted, this film was used in the absence of a liquid rubber adhesive. Similar to Example 7, Example 8 achieved high tack and cured bond strength with the use of an additional entanglement polymer based on chlorosulfonated polyethylene Example 9

Example 9 demonstrates the effect of the epoxy-based primer film used with Chemlok 236A adhesive on a number of different rigid substrates. Table 5 shows effect of rigid substrate type on cured peel strength values of rubber/rigid substrates bonded with an epoxy-based primer film and Chemlok 236A (LORD Corporation) adhesive. The primer film was the same film prepared in Example 1, applied to various rigid substrates in addition to cold-rolled steel, and bonded using Chemlok 236A adhesive (see Table 1 and Example 1 preparation detail). The assemblies were cured via Cure 3 (see Example 1 preparation detail). The data in Table 5 shows that high cured peel strength values were attained on cold-rolled steel, stainless steel, aluminum, and epoxy/glass fiber composite.

TABLE 5

Effect of rigid substrate type on cured peel strength values of rubber/rigid substrates bonded with the epoxy-based primer film from Example 1 and Chemlok 236A adhesive.

| Substrate | Peel Strength (pli)[a] |
|---|---|
| Grit Blasted CRS | 34.3 |
| Grit Blasted SS | 40.0 |
| Grit Blasted Al | 44.0 |
| Epoxy/Glass Fiber Composite | 53.4 |

[a]Rubber Substrate = LORD HC130 NR Stock, Film used as a primer and hot compression cured (Cure 3 in Example 1) with Chemlok 236A adhesive Example 10

Example 10 demonstrates the effect of an epoxy-based primer film used with Chemlok 236A adhesive on a number of different elastomeric substrates.

TABLE 6

Effect of rubber substrate type on cured peel strength values of rubber/cold-rolled steel substrates bonded with the epoxy-based primer film from Example 1 and Chemlok 236A adhesive.

| Substrate | Cure Time (min) | Cure Temp (° C.) | Peel Strength (pli)[a] |
|---|---|---|---|
| Natural Rubber (HC130) | 16 | 171 | 34.3 |
| Nitrile (KA135M) | 12.5 | 171 | 106.2 |
| Neoprene (N135B) | 16.5 | 171 | 94.9 |
| Styrene-Butadiene (HC2020) | 17 | 171 | 82.1 |

[a]Rubber Substrate = LORD HC130 NR Stock, Film used as a primer and hot compression cured (Cure 3 in Example 1) with Chemlok 236A adhesive Table 6 shows effect of rubber substrate type on cured peel strength values of rubber/cold-rolled steel substrates bonded with an epoxy-based primer film and Chemlok 236A adhesive. The primer film was the same film prepared in Example 1, applied to cold-rolled steel and bonded to various rubbers using Chemlok 236A adhesive (see Table 1 and Example 1 preparation detail). Samples were cured using a Wabash G30H-18-BX compression molder at 171°

C. from 12.5 to 17 min, depending upon the type of rubber (see Table 6). The data in Table 6 shows that very high cured peel strength values were attained on natural, nitrile, neoprene, and styrene butadiene rubber substrates.

Example 11

Example 11 demonstrates the effectiveness of the adhesive film of Example 8 on a number of different elastomeric substrates.

TABLE 7

Effect of rubber substrate type on cured peel strength values of rubber/cold-rolled steel substrates bonded with the film of Example 8.

| Substrate | Peel Strength (pli)* |
|---|---|
| Natural Rubber (HC130) | 37.2 |
| Nitrile (KA135M) | 111.5 |
| Neoprene (N135B) | 88.3 |
| Styrene-Butadiene (HC2020) | 112.6 |

*Rubber Substrate = LORD HC130 NR Stock and hot compression cured (Cure 3 in Example 1)

Table 7 shows effect of rubber substrate type on cured peel strength values of rubber/cold-rolled steel substrates bonded with an adhesive film. The film was the same film prepared in Example 8, applied to cold-rolled steel and bonded to various rubbers (see Table 4 and Example 8 preparation detail). Samples were cured using a Wabash G30H-18-BX compression molder at 171° C. from 12.5 to 17 min, depending upon the type of rubber (see Table 6). The data in Table 7 shows that very high cured peel strength values were attained on natural, nitrile, neoprene, and styrene butadiene rubber substrates without the need for a liquid rubber adhesive.

Example 12

| Raw Ingredient | Role | Weight % |
|---|---|---|
| DGEBA (MW ~380 Dalton) | Resin | 8.3 |
| DGEBA (MW ~3900 Dalton) | Resin | 8.3 |
| Epoxy Dicyclopentadiene Novolak (MW ~500 Daltons) | Resin | 12.2 |
| Carboxylated Nitrile Elastomer Crumb | Entanglement Polymer | 4.3 |
| Dicyandiamide | Latent Curative | 2.6 |
| Aromatic substituted urea | Accelerator for latent Curative | 1.0 |
| Aluminum Oxide | Thermally Conductive Filler | 63.3 |
| Total | | 100 |

Epoxy-based adhesive films were prepared by first pre-dissolving the carboxylated nitrile elastomer crumb and solid DGEBA in MEK (33 and 50 weight percent, respectively—rolled overnight). Second, a preblend of epoxy dicyclopentadiene novolak and liquid DGEBA was prepared by preheating the novolak to 100° C. and mixing it with the appropriate concentration of liquid epoxy. The aforementioned blends were mixed together to at the appropriate concentrations using a DAC800 Hauschild at 1950 rpm for 1 minute. Mixing was repeated to give a homogeneous mixture. Dicyandiamide and aromatic substituted urea were added at concentrations of 8 phr and 3 phr, respectively, to maximum out life of the film while still providing very reactive conditions at high cure temperatures, namely 177° C. These were mixed in a similar manner to that of the preblends. Lastly, the aluminum oxide filler was added for the purpose of increasing thermal conductivity, while maintaining very high electrical resistivity. The filler sizes and relative amounts were chosen to provide optimum filler packing while collectively minimizing the fillers impact of viscosity or flow of the resin especially at higher temperatures prior to curing. The total filler loading for achieving 1 W/mK was determined empirically to be 63.3% by weight or 33.7% by volume.

Films of the formulation above including MEK were cast on silicone treated PET release liners using an automated drawdown table and a 6 mil Bird style casting bar at a casting speed of 25 mm/s. Immediately after casting the film, the films were taped down to a thin sheet of aluminum. A 12 g/m2 non-woven PET veil was then gently placed on the exposed surface of film followed by the placement of a temporary release liner. The veil was then pressed into place using 4 inch rubber hand roller. The laminate was then placed in preheated oven (Temp=50° C.) for 5 minutes to partially remove solvent. Next, the film was cooled with dry ice for ~5 minutes after which the temporary release film was quickly removed. The film was placed back into the oven for 15 minutes to fully remove any residual solvent.

TABLE 8

Unique combination properties of the uncured and cured formulation.

| Property | Result | State of Cure |
|---|---|---|
| Tack | Med/High - similar to Scotch ® Tape | Uncured |
| Thermal Conductivity | 1.0 W/mK | Cured |
| Glass Transition Temperature | 120° C. | Cured |

The handling properties, notably tack, cohesiveness, and ease of release from PET substrate was evaluated by hand and are presented in Table 8. Samples for thermal conductivity analyses were prepared by formulating 100% solids formulations by employing a very low molecular weight liquid DGEBA resin. Thermal conductivity was measured using a Netsch Nanoflash LFA447 instrument according to ASTM E1461. This afforded preparation of very thick (1 mm) void free samples needed form measuring thermal conductivity. The samples were prepared by pouring the formulation which required no MEK into a Teflon mold comprised of 1 mm thick, 12.5 mm diameter discs. The resulting value provides an accurate estimate of the aforementioned solvent-borne system as thermal conductivity is largely a function of the filler type and concentration. The samples were cured in a convection oven for 1 hr at 177° C. Glass transition temperature was determined using a differentiating scanning calorimeter set at heat rate of 10° C./min.

Example 13

Example 13 demonstrates an alternate multifunctional solid resin in an epoxy-based film adhesive used to directly bond rubber to cold-rolled steel. Example 13 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. Triphenylolmethane triglycidyl ether resin was preheated to 100° C., combined with diglycidylether of bisphenol A, DGEBA, (EPON 828, Momentive) and thoroughly mixed until the resins were fully dissolved. The nitrile rubber/MEK solution, trifunctional epoxy, and DGEBA, were added to a polypropylene cup according to the concentrations of Table 9. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) was then added to the mixture at a level of 8 phr based on the epoxy resin content. The mixture was further mixed using a DAC 800 Hauschild mixer at 1950 RPM for 1 minute. The mixing was repeated at least once to ensure adequate mixing of the contents of the cup. In order to reduce viscosity, 10% by weight toluene was added to the formulation and mixed at 1950 RPM for 1 minute. Dinitrosobenzene, in powder form, was added to formulation and mixed at 1950 RPM for 1 minute.

The adhesive film for Example 13 was cast and prepared according the procedure reported in Example 1. The thickness of the Bird bar was 7 mils (wet-thickness); which equated to dry film thickness of approximately 5 mils. Test specimens were prepared, cured using Cures 1 and 2, and tested according to the procedures in Example 1.

Example 13 shows that use of a liquid epoxy resin, a trifunctional epoxy resin, carboxylated nitrile entanglement polymer and two latent curatives, namely dicyandiamide and dinitrosobenzene, enabled adhesive films that exhibit high levels of tack and cured bond strength when used to directly bond natural rubber and cold-rolled steel substrates.

TABLE 9

Effect of trifunctional epoxy resin on cured peel strength values of rubber/CRS substrates bonded directly together using an epoxy-based adhesive film.

| Raw Ingredient | Role | Weight Percent |
| --- | --- | --- |
| Diglycidylether of bisphenol A (DGEBA) Resin (EEW = 185-192. MW = ~380) | Resin | 33.8 |
| Trifunctional Epoxy (EEW = 150-170, MW = ~480) | Resin | 33.8 |
| Carboxyated Nitrile Rubber (acrylonitrile content = 27%, Mooney Visco = 22-35) | Entanglement Polymer | 20.3 |
| Dicyandiamide | Latent Curative | 5.4 |
| Dinitrosobenzene | Latent Curative/ Elastomer Crosslinker | 6.8 |
| Total | | 100 |
| Peel Strength Results (pli) | | |
| Uncured - Tack[a] | | 9.3 |
| Open Steam Cure[a] | | 50.3 |
| Autoclave Steam Cure[a] | | 68.7 |

[a]Substrates = CRS, 0.25" thick natural rubber (Enduraflex VE611BN), Film used as a primer and adhesive.

Examples 14-16

Example 14 involved first dissolving a polyacrylate elastomer at a concentration of 17% by weight in methyl ethyl ketone (MEK) by rolling the mixture in a large glass jar for at least 12 hours. A trifunctional epoxy was preheated to 100° C., combined with diglycidylether of bisphenol A, DGEBA, (EPON 828, Momentive) and thoroughly mixed until the resins were fully dissolved. The polyarcrylate elastomer/MEK solution, trifunctional epoxy, and DGEBA, were added to a polypropylene cup according to the concentrations of Table 10. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) was then added to the mixture at a level of 8 phr based on the epoxy resin content. The mixture was further mixed using a DAC 800 Hauschild mixer at 1950 RPM for 1 minute. The mixing was repeated at least once to ensure adequate mixing of the contents of the cup. In order to reduce viscosity, 10% by weight toluene was added to the formulation and mixed at 1950 RPM for 1 minute. Dinitrosobenzene in powder form was added to formulation and mixed at 1950 RPM for 1 minute.

The films for Examples 14, 15, and 16 were cast and prepared according the procedure reported in Example 1. The thickness of the Bird bar was 7 mils (wet-thickness); which equated to dry film thickness of approximately 5 mils. Test specimens were prepared, cured using Cure 1, and tested according to the procedures in Example 1. For Example 14, the film adhesive was applied directly to the rubber substrate prior to assembling the metal coupon/film/rubber. For Example 15, the film adhesive was applied directly to the rubber substrate prior to assembling the metal coupon/film/rubber. However, before coupon/film/rubber assembly, a water based metal primer, Chemlok 8009B (LORD Corporation), was applied to the metal coupons. For Example 16, the film adhesive was applied directly to the rubber substrate prior to assembling the metal coupon/film/rubber. However, before coupon/film/rubber assembly, an organic solvent based metal primer, Chemlok 289 (LORD Corporation), was applied to the metal coupons.

Examples 14, 15, and 16 show that use of a liquid epoxy resin, a non-amine containing trifunctional epoxy resin, polyacrylate entanglement polymer and two latent curatives, namely dicyandiamide and dinitrosobenzene, enabled adhesive films that exhibit high levels of tack and cured bond strength when used without primer or in conjunction with water-based and organic solvent based primers to bond natural rubber and cold-rolled steel substrates.

TABLE 10

Effect of water-based and organic solvent-based primers on cured peel strength values of rubber directly bonded to CRS substrates with an epoxy-based adhesive film.

|  |  | Weight percent | | |
|---|---|---|---|---|
|  |  | 14 | 15 | 16 |
|  |  |  | Primer | |
| Raw Ingredient | Role | None | Chemlok 8009B | Chemlok 289 |
| Diglycidylether of bisphenol A (DGEBA) Resin (EEW = 185-192. MW = ~380) | Resin | 33.8 | 33.8 | 33.8 |
| Trifunctional epoxy (EEW = 150-170, MW = ~480) | Resin | 33.8 | 33.8 | 33.8 |
| Polyacrylate elastomer (Mooney Visco = 46-58 at 100° C.) | Entanglement Polymer | 20.3 | 20.3 | 20.3 |
| Dicyandiamide | Latent Curative | 5.4 | 5.4 | 5.4 |
| Aromatic substituted urea | Accelerator for latent curative | — | — | — |
| Dinitrosobenzene | Latent Curative/ Elastomer Crosslinker | 6.8 | 6.8 | 6.8 |
| Total |  | 100 | 100 | 100 |
| Peel Strength Results (pli) | | | | |
| Uncured - Tack[a] |  | 6.9 | 5.7 | 1.9 |
| Open Steam Cure[a] |  | 35.7 | 36.3 | 44 |

[a] Substrates = CRS, 0.25" thick natural rubber (Enduraflex VE611BN), Film used as an adhesive in conjunction with water-based or organic solvent-based metal primer

Examples 17-19

Examples 17-19 demonstrate different entanglement polymers for use in the embodiments of the present invention. Example 17 involved first dissolving hydrogenated nitrile rubber (Zetpol 4310, Zeon Chemicals) at a concentration of 17% by weight in methyl ethyl ketone (MEK) by rolling the mixture in a large glass jar for at least 12 hours. Triphenylolmethane triglycidyl ether resin (Tactix 742, Huntsman) was preheated to 100° C., combined with diglycidylether of bisphenol A, DGEBA, (EPON 828, Momentive) and thoroughly mixed until the resins were fully dissolved. The HNBR elastomer/MEK solution, trifunctional epoxy, and DGEBA, were added to a polypropylene cup according to the concentrations of Table 11. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) was then added to the mixture at a level of 8 phr based on the epoxy resin content. The mixture was further mixed using a DAC 800 Hauschild mixer at 1950 RPM for 1 minute. The mixing was repeated at least once to ensure adequate mixing of the contents of the cup. In order to reduce viscosity, 10% by weight toluene was added to the formulation and mixed at 1950 RPM for 1 minute. Dinitrosobenzene in powder form was added to formulation and mixed at 1950 RPM for 1 minute.

Example 18 was prepared as described above, except an ECH/EO/AGE terpolymer (Hydrin T3000, Zeon Chemicals) was first dissolved at a concentration of 17% by weight in methyl ethyl ketone (MEK) by rolling the mixture in a large glass jar for at least 12 hours and used in place of the HNBR elastomer/MEK solution.

Example 19 was prepared as described above, except a polyvinyl acetal entanglement polymer (KS-5Z, Sekisui Products, LLC) was first dissolved at a concentration of 17% by weight in methyl ethyl ketone (MEK) by rolling the mixture in a large glass jar for at least 12 hours and used in place of the HNBR elastomer/MEK solution.

The films for Examples 17, 18, and 19 were cast and prepared according to the procedure reported in Example 1. The thickness of the Bird bar was 7 mils (wet-thickness); which equated to dry film thickness of approximately 5 mils. Test specimens were prepared, cured using Cure 1 and 2, and tested according to the procedures in Example 1. The film adhesive for each examples was applied directly to the rubber substrate prior to assembling the metal coupon/film/rubber.

Examples 17-19 show that the use of a liquid epoxy resin, a trifunctional epoxy resin, two latent curatives, namely dicyandiamide and dinitrosobenzene, in conjunction with various entanglement polymers enabled adhesive films that exhibit high levels of tack and cured bond strength when used to directly bond natural rubber and cold-rolled steel substrates.

TABLE 11

Effect of entanglement polymer on cured peel strength values to directly bond rubber to CRS substrates using epoxy-based adhesive films.

| | | Weight Percent Example | | |
|---|---|---|---|---|
| | | 17 | 18 Primer | 19 |
| Raw Ingredient | Role | None | None | None |
| Diglycidylether of bisphenol A (DGEBA) Resin (EEW = 185-192. MW = ~380) | Resin | 33.8 | 33.8 | 33.8 |
| Triphenylolmethane triglycidyl ether (EEW = 150-170, MW = ~480) | Resin | 33.8 | 33.8 | 33.8 |
| Hydrogenated Nitrile Rubber (Mooney Visco = 23-37 at 100° C.) | Entanglement Polymer | 20.3 | — | — |
| ECH/EO/AGE Terpolymer (Mooney Visco = 80-84 at 100° C.) | Entanglement Polymer | — | 20.3 | — |
| Polyvinyl Acetal Polymer | Entanglement Polymer | — | — | 20.3 |
| Dicyandiamide | Latent Curative | 5.4 | 5.4 | 5.4 |
| Dinitrosobenzene | Latent Curative/ Elastomer Crosslinker | 6.8 | 6.8 | 6.8 |
| Total | | 100 | 100 | 100 |
| Peel Strength Results (pli) | | | | |
| Uncured - Tack[a] | | 1.8 | 7.0 | 3.1 |
| Open Steam Cure[a] | | 41.2 | 53.1 | 56.4 |
| Autoclave Steam Cure[a] | | 49.0 | 45.0 | 55.6 |

[a]Substrates = CRS, 0.25" thick natural rubber (Enduraflex VE611BN), Film used as both primer and adhesive

Examples 20-22

Examples 20-22 demonstrate an epoxy-based primer film and an epoxy-based adhesive film lamented together to create a bilayer film for elastomer to metal bonding. Example 20 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. Triphenylolmethane triglycidyl ether resin (Tactix 742, Huntsman) was preheated to 100° C., combined with diglycidylether of bisphenol A, DGEBA, (EPON 828, Momentive) and thoroughly mixed until the resins were fully dissolved. The carboxylated nitrile rubber/MEK solution, trifunctoinal epoxy, and DGEBA, were added to a polypropylene cup according to the concentrations of Table 11. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) and cycloaliphatic bisurea (U-35M, CVC Thermoset Specialties) were then added to the mixture at levels of 8 and 5 phr, respectively, based on the epoxy resin content. The mixture was further mixed using a DAC 800 Hauschild mixer at 1950 RPM for 1 minute. The mixing was repeated at least once to ensure adequate mixing of the contents of the cup. In order to reduce viscosity, 10% by weight toluene was added to the formulation and mixed at 1950 RPM for 1 minute.

Example 21 involved first dissolving chlorinated natural rubber (Perugt 5130, Bayer) at a concentration of 33% by weight in toluene by rolling the mixture in a large glass jar for at least 12 hours. A second entanglement polymer solution was then prepared by dissolving chlorosulfonated polyethylene (TS-340, Tosoh Corporation) at a concentration of 33% by weight in toluene by rolling the mixture in a large glass jar for at least 12 hours. Trifunctional epoxy resin was preheated to 100° C., combined with diglycidylether of bisphenol A, DGEBA, (EPON 828, Momentive) and thoroughly mixed until the resins were fully dissolved. The chlorinated natural rubber/toluene solution, chlorosulfonated polyethylene/toluene solution, trifunctional epoxy, and DGEBA, were added to a polypropylene cup according to the concentrations of Table 12. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) was then added to the mixture at a level of 8 phr based on the epoxy resin content. The mixture was further mixed using a DAC 800 Hauschild mixer at 1950 RPM for 1 minute. The mixing was repeated at least once to ensure adequate mixing of the contents of the cup. Dinitrosobenzene in powder form was added to formulation and mixed at 1950 RPM for 1 minute.

The films for Examples 20 and 21 were cast and prepared according to the procedure reported in Example 1. The thickness of the Bird bar was 4 mils (wet-thickness); which equated to dry film thickness of approximately 2 mils.

Example 22 involved first laminating films from Examples 20 and 21 together using a hand roller to create a bilayer solid film. This bilayer film comprises the film from Example 20 as the metal primer layer of the bilayer and the film from Example 21 as the rubber-adhesive layer of the bilayer. The bilayer film was further laminated under vacuum bag pressure (28 inHg) to ensure a compressed bilayer free of any gaps as the primer-adhesive interface.

Test specimens were prepared using films from Examples 20-22, cured using Cure 1, and tested according to the procedures in Example 1. The film adhesive for each example was applied directly to the rubber substrate prior to assembling the metal coupon/film/rubber.

Example 20 shows that the use of an epoxy resin, a non-amine containing trifunctional epoxy resin, carboxylated nitrile entanglement polymer and two latent curatives, namely dicyandiamide and dinitrosobenzene, enabled primer films that exhibit high levels of tack but relatively lower rubber adhesion when used to bond natural rubber and cold-rolled steel substrates.

Example 21 shows that the use of an epoxy resin, a non-amine containing trifunctional epoxy resin, two entanglement polymers, namely chlorinated natural rubber and chlorosulfonated polyethylene, and two latent curatives, namely dicyandiamide and dinitrosobenzene, enabled adhesive films that exhibit relatively low levels of tack, moderate metal adhesion, and high rubber adhesion when used to bond natural rubber and cold-rolled steel substrates.

Example 22 shows that the use of a bi-functional film laminate consisting of both primer functionality (Example 20) and adhesive functionality (Example 21) offers improved tack over the adhesive film alone, improved metal adhesion over the adhesive film alone, improved rubber adhesion over the primer film alone, and equivalent rubber adhesion to the adhesive film alone.

TABLE 12

Effect of film construction on cured peel strength values of rubber/CRS substrates bonded with an epoxy-based, bilayer film.

| Raw Ingredient | Role | Weight percent 20 | 21 | 22 Laminate of 20 and 21 |
|---|---|---|---|---|
| Diglycidylether of bisphenol A (DGEBA) Resin (EEW = 185-192. MW = ~380) | Resin | 35 | 31.6 | — |
| Triphenylolmethane triglycidyl ether (EEW = 150-170, MW = ~480) | Resin | 35 | 31.6 | — |
| Carboxyated Nitrile Rubber (acrylonitrile content = 27%, Mooney Visco = 22-35) | Entanglement Polymer | 21 | — | — |
| Chlorinated Natural Rubber | Entanglement Polymer | — | 9.5 | — |
| Chlorosulfonated Polyethylene | Entanglement Polymer | — | 9.5 | — |
| Dicyandiamide | Latent Curative | 5.6 | 5.1 | — |
| Aromatic substituted urea | Accelerator for latent curative | 3.5 | — | — |
| Dinitrosobenzene | Latent Curative/ Elastomer Crosslinker | — | 12.7 | — |
| Total | | 100 | 100 | — |
| Peel Strength Results (pli) | | | | |
| Uncured - Tack[a] | | 6.0 | 1.0 | 3.4 |
| Open Steam Cure[a] | | 35.7 | 22.2 | 43.3 |

[a]Substrates = CRS, 0.25" thick natural rubber (Enduraflex VE611BN), Film used as an adhesive in conjunction with water-based or organic solvent-based metal primer Examples 23-25

Examples 23-25 demonstrate a bilayer film prepared using a thin rubber sheet laminated with an epoxy-based film adhesive. Example 23 involved first dissolving polyacrylate elastomer (Hytemp 4451 EP, Zeon Chemicals 1472X) at a concentration of 14% by weight in propylene glycol methyl ether acetate (PGMEA) by rolling the mixture in a large glass jar for at least 12 hours. Triphenylolmethane triglycidyl ether resin (Tactix 742, Huntsman) was preheated to 100° C., combined with diglycidylether of bisphenol A, DGEBA, (EPON 828, Momentive) and thoroughly mixed until the resins were fully dissolved. The polyacrylate elastomer/PGMEA solution, trifunctional epoxy, and DGEBA, were added to a polypropylene cup according to the concentrations of Table 13. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) was then added to the mixture at 8 phr based on the epoxy resin content. The mixture was further mixed using a DAC 800 Hauschild mixer at 1950 RPM for 1 minute. Dinitrosobenzene in slurry form (i.e. 35 weight percent pre-dispersed in xylene) was added to formulation and mixed at 1950 RPM for 1 minute. The mixing was repeated at least once to ensure adequate mixing of the contents of the cup.

Example 24 involved first dissolving natural rubber (HC3505-3, LORD) at a concentration of 14% by weight in toluene by rolling the mixture in a large glass jar for at least 12 hours. A solid C5 hydrocarbon resin (Picco 5140, Eastman Chemical Company) solution was next dissolved in toluene at a concentration of 50% by weight by rolling the mixture in a large glass jar for at least 12 hours. The natural rubber/toluene solution, solid C5 hydrocarbon resin/toluene solution, and liquid C5 hydrocarbon resin (Wingtack 10, Total Cray Valley) were added to a polypropylene cup according to the concentrations of Table 13. The cup and its contents were mixed using a DAC 800 Hauschild mixer at 1950 RPM for 1 minute. The mixing was repeated at least once to ensure adequate mixing of the contents of the cup.

Films from the resulting mixtures of Example 23 and Example 24 were cast and prepared according to the procedure reported in Example 1. The thickness of the Bird bar was 4 mils (wet-thickness); which equated to dry film thickness of approximately 2 mils.

Example 25 involved first laminating the film of Example 23 and the film of Example 24 together using a hand roller to create a bilayer film, where the film of Example 23 comprised the epoxy-based primer layer and the film of Example 24 comprised the adhesive layer. The bilayer film was further laminated under vacuum bag pressure (28 inHg) to ensure a compressed bilayer film free of any gaps at the primer-adhesive layer interface.

Test specimens were prepared using the bilayer film from Example 25, cured using Cure 1, and tested according to the procedures in Example 1. The bilayer film adhesive was applied directly to the rubber substrate prior to assembling the metal coupon/film/rubber.

Example 25, see Table 13, shows that the use of a bilayer film consisting of a) a primer layer containing epoxy resin, a non-amine containing trifunctional epoxy resin, polyacrylate entanglement polymer and two latent curatives, namely dicyandiamide and dinitrosobenzene and b) a rubber layer consisting of tackified natural rubber, enables equivalent rubber substrate adhesion when compared to monolayer adhesive films. Additionally, Example 27 demonstrates the use of a tackified rubber layer to compatibilize a functional primer layer with a rubber substrate.

TABLE 13

Bilayer film: Epoxy based primer film/tackified NR-based film composition and resulting cured peel strength when used alone to bond rubber to cold-rolled steel.

| | | Weight Percent | | |
|---|---|---|---|---|
| Raw Ingredient | Role | 23 | 24 | 25 Laminate of 23 and 24 |
| Diglycidylether of bisphenol A (DGEBA) Resin (EEW = 185-192. MW = ~380) | Resin - Film Matrix | 35.6 | — | — |
| Triphenylolmethane triglycidyl ether (EEW = 150-170, MW = ~480) | Resin - Film Matrix | 35.6 | — | — |
| C5 Hydrocarbon Resin (Tg ~−31° C.) | Resin - Tackifier | — | 14.0 | — |
| C5 Hydrocarbon Resin (Tg ~84° C.) | Resin - Tackifier | — | 51.0 | — |
| Polyacrylate Elastomer (Mooney Visco = 46-58) | Entanglement Polymer | 21.3 | — | — |
| Natural Rubber (Mooney Visco = 70) | Entanglement Polymer | — | 35.0 | — |
| Dicyandiamide | Latent Curative | 5.7 | — | — |
| Dinitrosobenzene | Latent Curative/ Elastomer Crosslinker | 1.9 | — | — |
| Total | | 100 | 100 | — |
| | | | | Peel Strength Results (pli) |
| Open Steam Cure[a] | | — | — | 47.5 |

[a] Substrates = CRS, 0.25" thick natural rubber (Enduraflex VE611BN)

Example 26

Example 26 employs an acrylic chemistry to the film adhesive of the present invention. Example 26 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. The nitrile rubber/MEK solution, bisphenol A epoxy methacrylate oligomer (CN154, Sartomer), and as-received blend of 60% trifunctional epoxy novolac acrylate blended with 40% trimethylpropane triacrylate (CN112C60, Sartomer), were added to a polypropylene cup according to the concentrations of Table 14. The cup and its contents were mixed using a DAC 800 Hauschild mixer at 1950 RPM for 1 minute. The mixing was repeated at two times to ensure adequate mixing and dissolution of the contents of the cup. Ethylene glycol methacrylate phosphate (LORD Corporation) and a 33.3 weight percent solution of dicumyl peroxide (Sigma Aldrich) in MEK were then added to the mixture according to the concentrations of Table 14. The mixture was further mixed using a DAC 800 Hauschild mixer at 1950 RPM for 1 minute. The mixing was repeated to ensure adequate mixing of the contents of the cup.

A film of the resulting mixture was cast and prepared according to the procedure reported in Example 1. The thickness of the Bird bar was 8 mils (wet-thickness); which equated to a dry film thickness of approximately 5 mils. Test specimens based on cold-rolled steel (CRS), film adhesive, and natural soft rubber (Enduraflex VE611BN) were prepared and tested before cure for tack and after cure using Cure 1 and Cure 2 conditions outlined in Example 1. Test specimens based on CRS, film adhesive, and milled natural rubber stock (HC-130, a heat-resistant semi-EV natural rubber from LORD Corporation) were also prepared and tested for bond strength after curing in a heated pressure according to Cure 3 reported in Example 1.

Table 14 shows that substantial levels of tack are achievable when the acrylate-based film is used to directly bond natural rubber to cold-rolled steel. Similarly, moderate cured peel strengths are also achieved when curing the aforementioned test specimens via autoclave and hot compression cure.

TABLE 14

One Part Acrylic. Acrylic-based adhesive film composition and resulting tack and cured peel strength values when used to directly bond rubber to cold-rolled steel.

| Raw Ingredient | Role | Weight Percent |
| --- | --- | --- |
| bisphenol A epoxy methacrylate oligomer (functionality = 2, viscosity at 70° C. = 1.38 Pa × s) | Resin | 36.78 |
| 60% trifunctional epoxy novalac acrylate blended with 50% trimethylpropane triacrylate (functionality = 3.3, viscosity at 60° C. = 1.28 Pa × s) | Resin | 37.26 |
| Carboxyated Nitrile Rubber (acrylonitrile content = 27%, Mooney Visco = 22-35) | Entanglement Polymer | 22.54 |
| Ethylene glycol methacrylate phosphate | Metal adhesion promoter | 2.62 |
| Dicumyl peroxide | Elastomer Crosslinker | 0.80 |
| Total | | 100 |

| | Peel Strength Results (pli) |
| --- | --- |
| Uncured - Tack[a] | 5.5 |
| Open Steam Cure[a] | 0 |
| Autoclave Steam Cure[a] | 13.3 |
| Compression Cure [b] | 18.1 |

[a]Substrates = CRS, 0.25" thick natural rubber (Enduraflex VE611BN)
[b] Substrates = CRS, LORD HC130 NR Stock Example 27

Example 27 demonstrates a substrate-applied activator for an acrylic film adhesive. Example 27 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. The nitrile rubber/MEK solution, bisphenol A epoxy methacrylate oligomer (CN154, Sartomer), allylic functional aliphatic oligomer (CN9102, Sartomer), and as-received blend of 60% trifunctional epoxy novalac acrylate blended with 40% trimethylpropane triacrylate (CN112C60, Sartomer) were added to a polypropylene cup according to the concentrations of Table 15. The cup and its contents were mixed using a DAC 800 Hauschild mixer at 1950 RPM for 1 minute. The mixing was repeated at two times to ensure adequate mixing and dissolution of the contents of the cup. Ethylene glycol methacrylate phosphate (LORD Corporation) was then added to the mixture according to the concentrations of Table 15. The mixture was further mixed using a DAC 800 Hauschild mixer at 1950 RPM for 1 minute. The mixing was repeated to ensure adequate mixing of the contents of the cup.

A film of the resulting mixture was cast and prepared according to the procedure reported in Example 1. The thickness of the Bird bar was 8 mils (wet-thickness); which equated to a dry film thickness of approximately 5 mils. The resulting film was then nip rolled onto a vulcanized bromobutyl rubber substrate. The film/bromobutyl laminate was applied to a metallic, cold-rolled steel (CRS) substrate coated with a liquid accelerator (LORD Accelerator 19, LORD Corporation) containing benzoyl peroxide initiator. The test specimen consisting of CRS, LORD Accelerator 19, film, and vulcanized bromobutyl rubber stock was convection cured at 100° C. for 8 hours. Samples were tested in accordance with the procedure outlined in Example 1.

Table 15 shows that moderate cured peel strengths are achieved when bonding the aforementioned test specimen using convection cure. Table 15 also demonstrates the use of a contact cure film/accelerator system (Example 27 and Accelerator 19) for vulcanized rubber bonding.

TABLE 15

Acrylic film composition and peel strength values when used in conjunction with a liquid activator applied to the metal to bond rubber to cold-rolled steel.

| Raw Ingredient | Role | Weight Percent |
| --- | --- | --- |
| Bisphenol A epoxy methacrylate oligomer (functionality = 2, viscosity at 70° C. = 1.38 Pa*s) | Resin | 27.9 |
| Allylic functional aliphatic oligomer | Resin | 19.6 |
| 60% trifunctional epoxy novalac acrylate blended with 50% trimethylpropane triacrylate (functionality = 3.3, viscosity at 60° C. = 1.28 Pa*s) | Resin | 27.9 |
| Carboxyated Nitrile Rubber (acrylonitrile content = 27%, Mooney Viscosity = 22-35) | Entanglement Polymer | 22.6 |
| Ethylene glycol methacrylate phosphate | Metal adhesion promoter | 1.9 |
| Total | | 100 |

TABLE 15-continued

Acrylic film composition and peel strength values when used in conjunction with a liquid activator applied to the metal to bond rubber to cold-rolled steel.

| | Peel Strength Results (pli) |
|---|---|
| Convection Cure[a] | 31 |

[a]100° C., 8 hours. Substrates = CRS, 0.25", bromobutyl rubber (Lingard BB). CRS substrate primed with LORD Accelerator 19

Example 28

Example 28 involved first adding di-o-ally bisphenol A (GP-206, GP Chemicals), an adduct of the diglycidylether of bisphenol A and a butadiene-acrylonitrile elastomer (RA-1340, CVC Thermoset Specialties), 4,4'-diphenylmethane-uretdione-diisocyanate (A2Bond, EMS-Griltech), and zinc acetylacetonate hydrate (Product 132306, Aldrich) to a polypropylene cup at concentrations according to Table 16. The blend was mixed using a DAC 800 Hauschild mixer at 1000 RPM for 1 minute. The ingredients were hand-mixed and the remixed at 1000 RPM for 1 minute. Phenol-formaldehyde resin (LORD Corporation) was added at levels according the Table 16 and mixed at 1950 RPM for 1 minute. Next, epoxy-terminated, phenoxy resin (JER 1256, Japanese Epoxy Resins Co.) pre-dissolved in MEK at a concentration of 33.3% by weight was added to the formulations based on the concentration according to Table 16. The formulation was mixed at 1950 RPM for 1 minute. Lastly, dinitrosobenzene in slurry form i.e. 39 weight percent pre-dispersed in xylene) percent was added to the formulation according to the concentration listed in Table 16. The formulation was mixed at 1950 RPM for 1 minute, then mixed by hand, and mixed again at 1950 RPM for 1 min.

A film of the resulting mixture was cast and prepared according to the procedure reported in Example 1, however, no veil was used. The thickness of the Bird bar was 8 mils (wet-thickness); which equated to a dry film thickness of approximately 5 mils. Test specimens based on cold-rolled steel (CRS), film adhesive, and natural soft rubber (Enduraflex VE611BN) were prepared and tested before cure for tack and after curing via Cure 1, per Example 1. Note, given the sensitivity of isocyanates to water, the cured-specimens were wrapped with tape prevent in exposure to the edges of the steel-rubber bondline.

Table 16 shows that marginal levels of tack are achievable when the urethane-based film is used directly to bond CRS-natural rubber substrate. Similarly, marginal, but significant, cure peel strengths are also achieved when curing the aforementioned test specimens via autoclave and hot compression cure.

TABLE 16

Urethane-based adhesive film composition and resulting tack and cured peel strength values when used to directly bond rubber to cold-rolled steel.

| Raw Ingredient | Role | Weight Percent |
|---|---|---|
| Dially bisphenol A | Resin | 25.7 |
| Phenol-formaldehyde resin | Resin | 22.9 |
| Adduct of the diglycidylether of bisphenol A (DGEBA) and a butadiene-acrylonitrile (CTBN) elastomer | Resin | 14.3 |
| High molecular weight phenoxy resin | Entanglement Polymer | 13.5 |
| MDI-uretdione | Latent curative | 7.2 |
| Zinc Acetylacetonate Hydrate | Catalyst for latent curative | 1.8 |
| Dinitrosobenzene | Latent Curative/ Elastomer Crosslinker | 14.5 |
| Total | | 100.0 |

| | Peel Strength Results (pli) |
|---|---|
| Uncured - Tack[a] | 0.4 |
| Open Steam Cure[a] | 9.7 |

[a]Substrates = CRS, 0.25" thick natural rubber (Enduraflex VE611BN)

Examples 29-31

Examples 29-31 demonstrate alternative elastomer cross-linkers. Example 29 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. Triphenylolmethane triglycidyl ether resin (Tactix 742, Huntsman) was preheated to 100° C., combined with diglycidylether of bisphenol A, DGEBA, (EPON 828, Momentive) and thoroughly mixed until the resins were fully dissolved. The carboxylated nitrile rubber/MEK solution, trifunctional epoxy, and DGEBA, were added to a polypropylene cup according to the concentrations of Table 17. The cup and its contents were mixed using a DAC 800 Hauschild mixer at 1950 RPM for 1 minute. The mixing was repeated at least once to ensure adequate mixing of the contents of the cup. Dicyandiamide (DDA 10, CVC Thermoset Specialties) was then added to the mixture at 8 phr based on the epoxy resin content. The mixture was further mixed using a DAC 800 Hauschild mixer at 1950 RPM for 1 minute. Phenylene bismaleimide (Homide 125, HOS-Technik) was added to formulation and mixed at 1950 RPM for 1 minute. The mixing was repeated at least once to ensure adequate mixing of the contents of the cup.

Example 30 was prepared in the same manner as Example 29 with the exception that polyphenylene bismaleimide (Homide 122, HOS-Technik) was used in place of phenylene bismaleimide. Example 31 was also prepared in the same manner as Example 29 with the exception that quinone dioxime (QDO, LORD Corporation) and dicumyl peroxide were used in place of phenylene bismaleimide in accordance with Table 17.

Films of the resulting mixtures were cast and prepared according to the procedure reported in Example 1. The thickness of the Bird bar was 8 mils (wet-thickness); which equated to a dry film thickness of approximately 5 mils. Test specimens based on cold-rolled steel (CRS), film adhesive, and natural soft rubber (Enduraflex VE611BN) were prepared and cured according to Cure 1. After cure, samples were tested in accordance with the procedure described in Example 1.

Examples 29, 30, and 31 (see Table 17) show that moderate cured peel strengths are achieved using non-dinitrosobenzene elastomer-to-resin crosslinkers when bonding the aforementioned test specimens using Cure 1.

(EPON 828, Momentive) and thoroughly mixed until the resins were fully dissolved. The carboxylated nitrile rubber/MEK solution, trifunctional epoxy, and DGEBA, were added to a polypropylene cup according to the concentrations of Table 18. The cup and its contents were mixed using a DAC 800 Hauschild mixer at 1950 RPM for 1 minute. The mixing was repeated at least once to ensure adequate mixing of the contents of the cup. Cyclic polyamidoamine (Aradur HT-9506, Huntsman) was then added to the mixture at 38 phr based on the epoxy resin content. The mixture was further mixed using a DAC 800 Hauschild mixer at 1950 RPM for 1 minute. Dinitrosobenzene (35 weight percent in xylene) was added to formulation and mixed at 1950 RPM for 1 minute. The mixing was repeated at least once to ensure adequate mixing of the contents of the cup.

Example 33 was prepared in the same manner as Example 32 with the exception that 2,4-diamino-6-[T-methylimidazolyl-(1')]-ethyl-s-triazineisocyanuric acid adduct dihydrate (Curezol 2MA-OK, Air Products) was used in place of Aradur HT-9506 at 8 phr based on the epoxy resin content in accordance with Table 18.

Films of the resulting mixtures were cast and prepared according to the procedure reported in Example 1. The thickness of the Bird bar was 8 mils (wet-thickness); which equated to a dry film thickness of approximately 5 mils. Test

TABLE 17

The effect of epoxy-based films containing different elastomer crosslinkers on the cured peel strength of rubber bonded directly to cold-rolled steel.

| Raw Ingredient | Role | Weight Percent | | |
|---|---|---|---|---|
| | | 29 | 30 | 31 |
| Diglycidylether of bisphenol A (DGEBA) Resin (EEW = 185-192. MW = ~380) | Resin | 28.9 | 28.9 | 28.1 |
| Triphenylolmethane triglycidyl ether (EEW = 150-170, MW = ~480) | Resin | 28.9 | 28.9 | 28.1 |
| Carboxyated Nitrile Rubber (acrylonitrile content = 27%, Mooney Visco = 22-35) | Entanglement Polymer | 17.3 | 17.3 | 16.9 |
| Phenylene Bismaleimide | Elastomer Crosslinker | 20.2 | — | — |
| Polyphenylmethane Bismaleimide | Elastomer Crosslinker | — | 20.2 | — |
| Quinone Dioxime | Elastomer Crosslinker | — | — | 19.7 |
| Dicumyl Peroxide | Elastomer Crosslinker | — | — | 2.8 |
| Dicyandiamide | Latent Curative | 4.6 | 4.6 | 4.5 |
| Total | | 100 | 100 | 100 |
| Peel Strength Results (pli) | | | | |
| Open Steam Cure[a] | | 25.9 | 28 | 30 |

[a]Substrates = CRS, 0.25" thick natural rubber (Enduraflex VE611BN)

Examples 32-33

Examples 32 and 33 demonstrate different latent curatives for a film adhesive. Example 32 involved first dissolving carboxylated nitrile rubber crumb (Nipol 1472X, Zeon Chemicals) at a concentration of 33% by weight in methyl ethyl ketone (MEK) by rolling the mixture in a large glass jar for at least 12 hours. Triphenylolmethane triglycidyl ether resin (Tactix 742, Huntsman) was preheated to 100° C., combined with diglycidylether of bisphenol A, DGEBA, specimens based on cold-rolled steel (CRS), film adhesive, and natural soft rubber (Enduraflex VE611BN) were prepared and cured according to Cure 1. After cure, samples were tested in accordance with the procedure described in Example 1.

Examples 32 and 33 (see Table 18) show that moderate cured peel strengths are achieved using alternative latent amine co-curatives to that of dicyandiamide when bonding the aforementioned test specimens using Cure 1.

TABLE 18

Epoxy adhesive film compositions containing alternative latent curatives and their effect on cured peel strength values when used to directly bond rubber to cold-rolled steel.

| Raw Ingredient | Role | 32 | 33 |
|---|---|---|---|
| Diglycidylether of bisphenol A (DGEBA) Resin (EEW = 185-192. MW = ~380) | Resin | 29.8 | 36.2 |
| Trifunctional Epoxy (EEW = 150-170, MW = ~480) | Resin | 29.8 | 36.2 |
| Polyacrylate Elastomer (Mooney Visco = 46-58) | Entanglement Polymer | 11.9 | 14.5 |
| Cyclic Polyamidoamine | Latent Curative | 22.6 | — |
| 2,4-diamino-6-[2'-methylimidazolyl-(1')]-ethyl-s-triazineisocyanuric acid adduct dihydrate | Latent Curative | — | 5.8 |
| Dinitrosobenzene | Elastomer Crosslinker | 6.0 | 7.3 |
| Total | | 100 | 100 |
| Peel Strength Results (pli) | | | |
| Open Steam Cure[a] | | 27 | 16 |

[a]Substrates = CRS, 0.25" thick natural rubber (Enduraflex VE611BN)

Example 34

Table 19 shows the effect of rubber substrate type on cured peel strength values for rubber/cold-rolled steel substrates bonded with the adhesive film of Example 23. The adhesive film was prepared as described in Example 23 before being applied to cold-rolled steel and bonded to various rubbers. Samples were cured using autoclave steam, atmospheric (open) steam, and/or forced air in accordance with Table 19. The data in Table 19 shows that good cured peel strength values were attained on un-vulcanized bromobutyl and chlorobutyl rubber stock as well as on vulcanized natural rubber stock.

TABLE 19

Effect of rubber substrate type on cured peel strength values (pli) of rubber directly bond to cold-rolled steel substrates using the adhesive film from Example 23.

| | Rubber Substrate | | | |
|---|---|---|---|---|
| | Unvulcanized Chlorobutyl | Unvulcanized Chlorobutyl | Unvulcanized Bromobutyl | Vulcanized Natural |
| Steam Autoclave Cure[a] | 29 | 44 | 68 | — |
| Open Steam Cure[b] | 19 | — | 52 | — |
| Convection Cure[c] | — | — | — | 38 |

[a]2 hours at 120° C. Metal substrates = CRS
[b]24 hours at 82° C. Metal substrates = CRS
[c]8 hours at 120° C. Metal substrates = CRS

What is claimed is:

1. A film composition comprising a resin matrix, an entanglement polymer, and a latent curative, wherein the resin has a functionality of at least 2.0 and a viscosity of at least 0.1 Pascal-seconds, and the film is dimensionally stable at 25° C.

2. The film of claim 1, wherein the resin matrix comprises a mixture of a first resin and a second resin having different molecular weights.

3. The film of claim 2, wherein the first resin comprises a molecular weight of less than about 500 Daltons.

4. The film of claim 2, wherein the second resin comprises a molecular weight of about 400 to about 4000 Daltons.

5. The film of claim 2, wherein the first resin comprises between 40 and 60 weight percent, and the second resin comprises between 60 and 40 weight percent based on the total weight of the resin matrix.

6. The film of claim 1, wherein the resin matrix comprises at least one of a phenolic resin, an acrylic resin, or an epoxy resin and is liquid at 25° C.

7. The film of claim 1, wherein the resin matrix comprises an epoxy-functional resin.

8. The film of claim 1, wherein the resin matrix comprises an epoxy novolac, a tris-(hydroxyl phenyl) methane-based epoxy resin.

9. The film of claim 1, wherein the entanglement polymer comprises a high molecular weight polymer with a number average molecular weight of at least 15,000 Daltons.

10. The film of claim 9, wherein the molecular weight of the entanglement polymer is at least 100,000 Daltons.

11. The film of claim 1, wherein the entanglement polymer contains moieties capable of reacting with at least one of the resin matrix, or the latent curative.

12. The film of claim 1, wherein the entanglement polymer comprises at least one of carboxylated nitrile rubber, natural rubber, chlorinated natural rubber, epoxy terminated phenoxy polymer, an epoxy-rubber adduct, an unsaturated polymer such as chlorosulfonated polyethylene, hydrogenated nitrile butadiene rubber (HNBR), polyacrylate elastomers, or epichlorohydrin elastomers, or combinations thereof.

13. The film of claim 1, wherein the entanglement polymer comprises at least one of a block copolymer or a random copolymer.

14. The film of claim 1, wherein the latent curative comprises at least one of dicyandiamide, urea, or dinitrosobenzene (DNB).

15. The film of claim 14, wherein the dicyandiamide is present at about 2 to about 8 phr, the urea is present in an amount from 0 to about 5 phr, and the dinitrosobenzene is present in an amount from 0 to about 15 phr, based on the total weight of the rein and entanglement polymer.

16. The film of claim 1, wherein the latent curative comprises a catalyst and optionally an accelerator.

17. The film of claim 1, further comprising an elastomer crosslinker.

18. The film of claim 17, wherein the elastomer crosslinker comprises dinitrosobenzene.

19. The film of claim 1, wherein the resin is present from about 50 to about 70 weight percent, the entanglement polymer is present from about 15 to about 25 weight percent, and the latent curative is present from about 5 to about 15 weight percent, based on the total weight of those three constituents in the film.

20. The film of claim 1, further comprising a conductive filler comprising at least one of a thermally conductive filler or an electrically conductive filler.

21. The film of claim 1, wherein the film contains no water or solvent.

22. The film of claim 1, further comprising a metal adhesion promoter.

23. The film of claim 22, wherein the metal adhesion promoter comprises at least one of a phenolic resin, a silane, or an organotitanate.

24. The film of claim 1, disposed between an elastomer substrate and a metal substrate to form an assembly.

25. The film of claim 24, wherein no other primer or adhesive materials are disposed between the elastomer substrate and the metal substrate.

26. The film of claim 1, wherein the film in the assembly comprises a tack peel strength of at least 2 pli as measured according to ASTM D429.

27. The film of claim 24, wherein the elastomer substrate comprises at least one of natural rubber, nitrile, neoprene, chlorobutyl rubber, bromobutyl rubber, or styrene-butadiene rubber.

28. The film of claim 27, wherein the assembly is heated to at least 80° C. to cure the film.

29. The film of claim 28, wherein the cured film in the assembly exhibits a peel strength of at least 25 pli, as measured by ASTM D429.

30. The film of claim 1, incorporated into a multi-layer laminate comprising a primer side for contact with a metallic substrate and an adhesive side for contact with an elastomer.

31. The film of claim 1, incorporated into a multi-layer laminate comprising an additional layer comprising an elastomer film.

32. The film of claim 31, wherein the elastomer film is selected to correspond to an elastomer substrate.

* * * * *